United States Patent
Russell et al.

(10) Patent No.: US 12,066,575 B2
(45) Date of Patent: *Aug. 20, 2024

(54) LIDAR SYSTEM WITH ADJUSTABLE PULSE PERIOD

(71) Applicant: Luminar Technologies, Inc., Orlando, FL (US)

(72) Inventors: Austin K. Russell, Orlando, FL (US); Matthew D. Weed, Orlando, FL (US); Liam J. McGregor, San Juan Capistrano, CA (US); Jason M. Eichenholz, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,722

(22) Filed: Aug. 9, 2022

(65) Prior Publication Data

US 2022/0390572 A1 Dec. 8, 2022

Related U.S. Application Data

(63) Continuation of application No. 16/155,207, filed on Oct. 9, 2018, now Pat. No. 11,415,675.

(Continued)

(51) Int. Cl.
*G01S 7/481* (2006.01)
*G01S 7/48* (2006.01)
(Continued)

(52) U.S. Cl.
CPC .......... *G01S 7/4817* (2013.01); *G01S 7/4808* (2013.01); *G01S 7/484* (2013.01); *G01S 7/4861* (2013.01);
(Continued)

(58) Field of Classification Search
None
See application file for complete search history.

(56) References Cited

U.S. PATENT DOCUMENTS 9,383,753 B1 7/2016 Templeton
9,791,557 B1 10/2017 Wyrwas et al.
(Continued)

FOREIGN PATENT DOCUMENTS

| WO | 2014/014838 | 1/2014 | |
|---|---|---|---|
| WO | WO-2018055449 A2 * | 3/2018 | ........... B60Q 1/0023 |
| WO | 2019/069260 | 4/2019 | |

OTHER PUBLICATIONS

Wikipedia contributors. "Optical amplifier." Wikipedia, The Free Encyclopedia. Wikipedia, The Free Encyclopedia, May 31, 2023. Web. (Year: Aug. 7, 2023).*

(Continued)

*Primary Examiner* — Isam A Alsomiri
*Assistant Examiner* — Sanjida Naser

(57) ABSTRACT

In one embodiment, a lidar system includes a light source configured to emit pulses of light. The emitted pulses of light include one or more series of standard-resolution pulses alternating with one or more series of high-resolution pulses. Each series of the standard-resolution pulses includes multiple pulses having a standard pulse period, and each series of the high-resolution pulses includes multiple pulses having a high-resolution pulse period. The standard pulse period is greater than or equal to a round-trip time associated with a maximum range of the lidar system, and the high-resolution pulse period is less than the standard pulse period. The lidar system also includes a scanner configured to scan at least a portion of the emitted pulses of light across a field of regard.

19 Claims, 11 Drawing Sheets

Related U.S. Application Data

(60) Provisional application No. 62/569,981, filed on Oct. 9, 2017.

(51) Int. Cl.
| | |
|---|---|
| *G01S 7/484* | (2006.01) |
| *G01S 7/486* | (2020.01) |
| *G01S 7/4861* | (2020.01) |
| *G01S 7/4865* | (2020.01) |
| *G01S 17/26* | (2020.01) |
| *G01S 17/42* | (2006.01) |
| *G01S 17/89* | (2020.01) |
| *G01S 17/931* | (2020.01) |

(52) U.S. Cl.
CPC ............ *G01S 7/4865* (2013.01); *G01S 17/26* (2020.01); *G01S 17/42* (2013.01); *G01S 17/89* (2013.01); *G01S 17/931* (2020.01); *G01S 7/4868* (2013.01)

(56) References Cited

U.S. PATENT DOCUMENTS

| | | | |
|---|---|---|---|
| 9,874,629 | B2 | 1/2018 | Kostamovaara |
| 10,131,446 | B1* | 11/2018 | Stambler ................. G01S 13/22 |
| 10,345,437 | B1 | 7/2019 | Russell et al. |
| 10,802,120 | B1 | 10/2020 | LaChapelle et al. |
| 11,415,676 | B2 | 8/2022 | Danziger |
| 2002/0059042 | A1 | 5/2002 | Kacyra et al. |
| 2003/0043058 | A1 | 3/2003 | Jamieson et al. |
| 2005/0057741 | A1 | 3/2005 | Anderson et al. |
| 2005/0225478 | A1 | 10/2005 | Nakamura |
| 2005/0243301 | A1 | 11/2005 | Takagi |
| 2008/0123167 | A1 | 5/2008 | Weiss et al. |
| 2008/0158417 | A1 | 7/2008 | Living |
| 2008/0278715 | A1 | 11/2008 | Swenson et al. |
| 2008/0284704 | A1 | 11/2008 | Song et al. |
| 2009/0185159 | A1* | 7/2009 | Rohner ................... G01S 7/487 356/5.01 |
| 2010/0053715 | A1* | 3/2010 | O'Neill ............... G02B 26/105 356/3 |
| 2010/0172136 | A1* | 7/2010 | Williamson, III ...... F41H 13/00 359/489.08 |
| 2011/0286066 | A1 | 11/2011 | Weiss et al. |
| 2012/0263224 | A1 | 10/2012 | Mohnen |
| 2012/0281199 | A1* | 11/2012 | Thielen ................. H01S 5/5045 359/344 |
| 2013/0127854 | A1 | 5/2013 | Shpunt et al. |
| 2013/0207970 | A1 | 8/2013 | Shpunt et al. |
| 2013/0242363 | A1 | 9/2013 | Weiss et al. |
| 2013/0329808 | A1 | 12/2013 | Mohnen et al. |
| 2014/0043309 | A1 | 2/2014 | Go et al. |
| 2014/0063489 | A1 | 3/2014 | Steffey et al. |
| 2014/0240317 | A1 | 8/2014 | Go et al. |
| 2014/0300885 | A1 | 10/2014 | Debrunner et al. |
| 2014/0327945 | A1 | 11/2014 | Weiss et al. |
| 2016/0006914 | A1 | 1/2016 | Neumann |
| 2016/0047896 | A1 | 2/2016 | Dussan |
| 2016/0047903 | A1 | 2/2016 | Dussan |
| 2016/0274589 | A1* | 9/2016 | Templeton ........... G05D 1/0246 |
| 2017/0153319 | A1 | 6/2017 | Villeneuve et al. |
| 2017/0328990 | A1 | 11/2017 | Magee et al. |
| 2017/0350983 | A1 | 12/2017 | Hall et al. |
| 2018/0059248 | A1 | 3/2018 | O'Keefe |
| 2018/0113216 | A1 | 4/2018 | Kremer et al. |
| 2018/0172804 | A1 | 6/2018 | Gassend et al. |
| 2018/0188355 | A1 | 7/2018 | Bao et al. |
| 2018/0188357 | A1 | 7/2018 | Li et al. |
| 2018/0231644 | A1 | 8/2018 | Gassend et al. |
| 2018/0259645 | A1 | 9/2018 | Shu et al. |
| 2018/0284224 | A1 | 10/2018 | Weed et al. |
| 2018/0284234 | A1 | 10/2018 | Curatu |
| 2018/0329037 | A1 | 11/2018 | Bozchalooi |
| 2019/0107606 | A1 | 4/2019 | Russell et al. |
| 2019/0107607 | A1 | 4/2019 | Danziger |
| 2019/0107623 | A1 | 4/2019 | Campbell et al. |
| 2019/0129009 | A1 | 5/2019 | Eichenholz et al. |
| 2019/0154808 | A1 | 5/2019 | Gassend et al. |
| 2019/0180502 | A1 | 6/2019 | Englard et al. |
| 2019/0235083 | A1 | 8/2019 | Zhang et al. |
| 2019/0310368 | A1 | 10/2019 | LaChapelle |
| 2019/0324124 | A1 | 10/2019 | O'Keefe |
| 2020/0132851 | A1 | 4/2020 | Gassend et al. |
| 2020/0284908 | A1 | 9/2020 | Paulsen |

OTHER PUBLICATIONS

Non-Final Office Action for U.S. Appl. No. 17/318,506 dated Jul. 13, 2021.
International Search Report and Written Opinion for PCT/US2021/031973 dated Aug. 13, 2021.
Non-Final Office Action for U.S. Appl. No. 16/155,243 dated Sep. 8, 2021.
Final Office Action for U.S. Appl. No. 16/155,243 dated Feb. 2, 2022.
Non-Final Office Action dated Mar. 30, 2022 for U.S. Appl. No. 16/155,337.
Non-Final Office Action dated Oct. 12, 2023 for U.S. Appl. No. 17/886,671.

* cited by examiner ial Application No. 62/569,981, filed 9 Oct. 2017, both of which are incorporated herein by reference.

LIDAR SYSTEM WITH ADJUSTABLE PULSE PERIOD

PRIORITY

This application is a continuation of U.S. patent application Ser. No. 16/155,207, filed 9 Oct. 2018, which claims the benefit, under 35 U.S.C. § 119(e), of U.S. Provisional Application No. 62/569,981, filed 9 Oct. 2017, both of which are incorporated herein by reference.

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

DESCRIPTION OF EXAMPLE EMBODIMENTS

Figure 1:
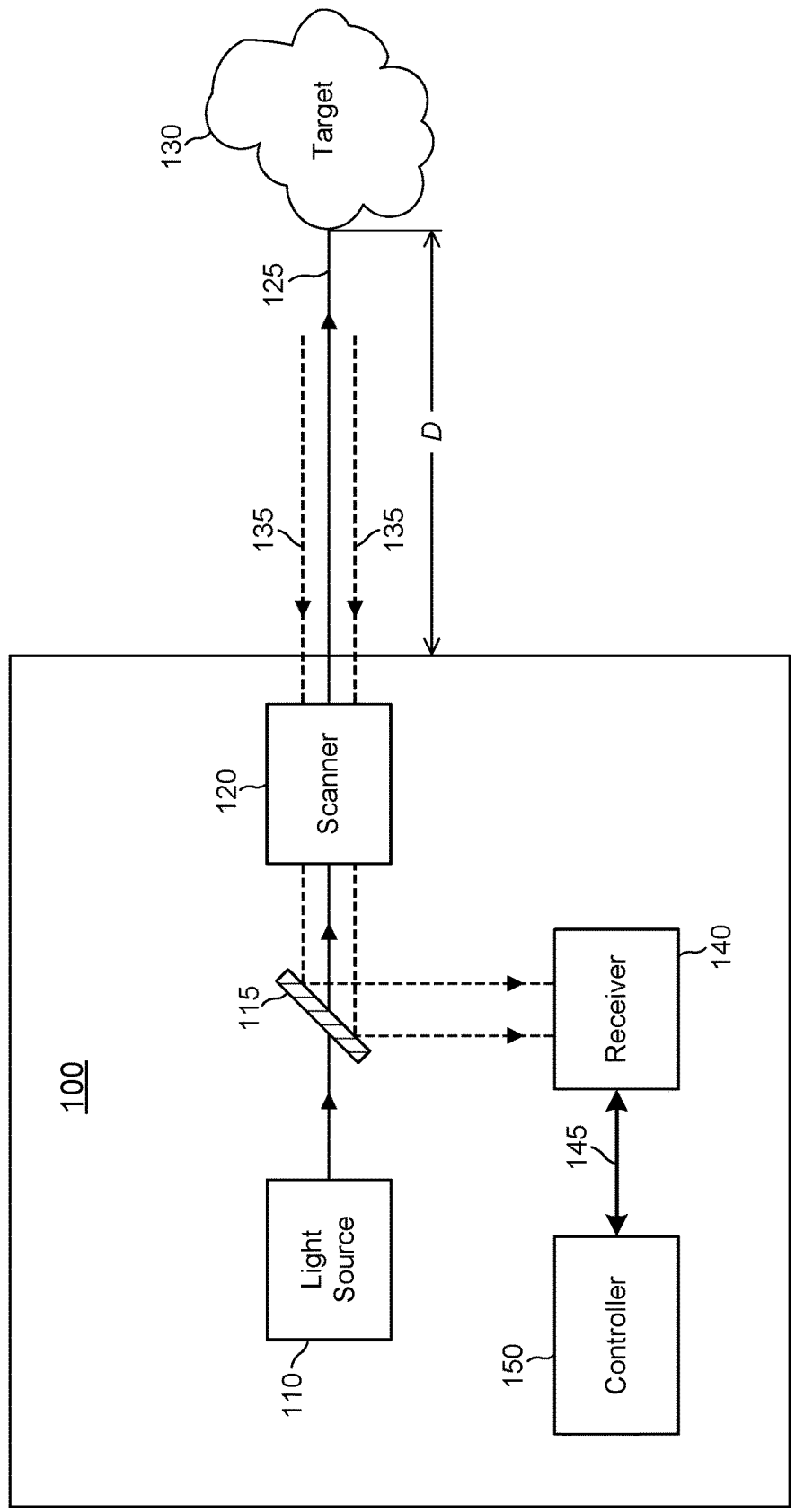
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with an operating wavelength between approximately 1.2 µm and 1.7 µm. The light source 110 emits an output beam of light 125 which may be continuous-wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is directed by mirror 115 to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ. In particular embodiments, output beam 125 may be referred to as a laser beam, light beam, optical beam, emitted beam, or beam. In particular embodiments, input beam 135 may be referred to as a return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and generate one or more representative signals. For example, the receiver 140 may generate an output electrical signal 145 that is representative of the input beam 135. This electrical signal 145 may be sent to controller 150. In particular embodiments, controller 150 may include a processor, computing system (e.g., an ASIC or FPGA), or other suitable circuitry configured to analyze one or more characteristics of the electrical signal 145 from the receiver 140 to determine one or more characteristics of the target 130, such as its distance downrange from the lidar system 100. This can be done, for example, by analyzing the time of flight or phase modulation for a beam of light 125 transmitted by the light source 110. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as D=c·T/2, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 µs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 µs, 200 µs, 400 µs, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 100 kHz to 5 MHz or a pulse period (e.g., a time between consecutive pulses) of approximately 200 ns to 10 µs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 µs. As another example, light source 110 may have a pulse repetition frequency that can be varied from approximately 500 kHz to 3 MHz. As used herein, a pulse of light may be referred to as an optical pulse, a light pulse, or a pulse.

In particular embodiments, light source 110 may produce a pulsed or CW free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 µJ, 0.1 µJ, 1 µJ, 10 µJ, 100 µJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E = P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 µJ has a peak power of approximately 1 kW. The average power ($P_{av}$) of an output beam 125 can be related to the pulse repetition frequency (PRF) and pulse energy by the expression $P_{av} = \text{PRF} \cdot E$. For example, if the pulse repetition frequency is 500 kHz, then the average power of an output beam 125 with 1-µJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, or a vertical-cavity surface-emitting laser (VCSEL). As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed laser diode with a peak emission wavelength between 1400 nm and 1600 nm. As an example, light source 110 may include a current-modulated InGaAsP DFB laser diode that produces optical pulses at a wavelength of approximately 1550 nm.

In particular embodiments, light source 110 may include a pulsed or CW laser diode followed by one or more optical-amplification stages. As an example, light source 110 may be a fiber-laser module that includes a CW or current-modulated laser diode with an operating wavelength of approximately 1550 nm followed by a single-stage or a multi-stage erbium-doped fiber amplifier (EDFA). As another example, light source 110 may include a continuous-wave (CW) or quasi-CW laser diode followed by an external optical modulator (e.g., an electro-optic amplitude modulator), and the output of the modulator may be fed into an optical amplifier. As another example, light source 110 may include a pulsed or CW laser diode followed by a semiconductor optical amplifier (SOA). The SOA may include an active optical waveguide configured to receive light from the laser diode and amplify the light as it propagates through the waveguide. The SOA may be integrated on the same chip as the laser diode, or the SOA may be a separate device with an anti-reflection coating on its input facet or output facet. In particular embodiments, light source 110 may include a laser diode which produces optical pulses that are not amplified by an optical amplifier. As an example, a laser diode (which may be referred to as a direct emitter or a direct-emitter laser diode) may emit optical pulses that form an output beam 125 that is directed downrange from a lidar system 100. A light source 110 that includes a direct-emitter laser diode may not include an optical amplifier, and the optical pulses produced by a direct emitter may not be amplified. A direct-emitter laser diode may be driven by an electrical power source that supplies current pulses to the laser diode, and each current pulse may result in the emission of an output optical pulse.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce linearly polarized light, and lidar system 100 may include a quarter-wave plate that converts this linearly polarized light into circularly polarized light. The circularly polarized light may be transmitted as output beam 125, and lidar system 100 may receive input beam 135, which may be substantially or at least partially circularly polarized in the same manner as the output beam 125 (e.g., if output beam 125 is right-hand circularly polarized, then input beam 135 may also be right-hand circularly polarized). The input beam 135 may pass through the same quarter-wave plate (or a different quarter-wave plate) resulting in the input beam 135 being converted to linearly polarized light which is orthogonally polarized (e.g., polarized at a right angle) with respect to the linearly polarized light produced by light source 110. As another example, lidar system 100 may employ polarization-diversity detection where two polarization components are detected separately. The output beam 125 may be linearly polarized, and the lidar system 100 may split the input beam 135 into two polarization components (e.g., s-polarization and p-polarization) which are detected separately by two photodiodes (e.g., a balanced photoreceiver that includes two photodiodes).

In particular embodiments, lidar system 100 may include one or more optical components configured to condition, shape, filter, modify, steer, or direct the output beam 125 or the input beam 135. As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto an active region of a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto an active region of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115. As an example, mirror 115 (which may be referred to as an overlap mirror, superposition mirror, or beam-combiner mirror) may include a hole, slot, or aperture which output light beam 125 passes through. As another example, mirror 115 may be configured so that at least 80% of output beam 125 passes through mirror 115 and at least 80% of input beam 135 is reflected by mirror 115. In particular embodiments, mirror 115 may provide for output beam 125 and input beam 135 to be substantially coaxial so that the two beams travel along substantially the same optical path (albeit in opposite directions).

In particular embodiments, lidar system 100 may include a scanner 120 to steer the output beam 125 in one or more directions downrange. As an example, scanner 120 may include one or more scanning mirrors that are configured to rotate, oscillate, tilt, pivot, or move in an angular manner about one or more axes. In particular embodiments, a flat scanning mirror may be attached to a scanner actuator or mechanism which scans the mirror over a particular angular range. As an example, scanner 120 may include a galvanometer scanner, a resonant scanner, a piezoelectric actuator, a polygonal scanner, a rotating-prism scanner, a voice coil motor, an electric motor (e.g., a DC motor, a brushless DC motor, a synchronous electric motor, or a stepper motor), or a microelectromechanical systems (MEMS) device, or any other suitable actuator or mechanism. In particular embodiments, scanner 120 may be configured to scan the output beam 125 over a 5-degree angular range, 20-degree angular range, 30-degree angular range, 60-degree angular range, or any other suitable angular range. As an example, a scanning mirror may be configured to periodically oscillate or rotate back and forth over a 15-degree range, which results in the output beam 125 scanning across a 30-degree range (e.g., a 0-degree rotation by a scanning mirror results in a 20-degree angular scan of output beam 125). In particular embodiments, a field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, or any other suitable FOR. In particular embodiments, a FOR may be referred to as a scan region.

In particular embodiments, scanner 120 may be configured to scan the output beam 125 (which includes at least a portion of the pulses of light emitted by light source 110) across a FOR of the lidar system 100. In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first mirror and a second mirror, where the first mirror directs the output beam 125 toward the second mirror, and the second mirror directs the output beam 125 downrange. As an example, the first mirror may scan the output beam 125 along a first direction, and the second mirror may scan the output beam 125 along a second direction that is substantially orthogonal to the first direction. As another example, the first mirror may scan the output beam 125 along a substantially horizontal direction, and the second mirror may scan the output beam 125 along a substantially vertical direction (or vice versa). In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern (which may be referred to as an optical scan pattern, optical scan path, or scan path) may refer to a pattern or path along which the output beam 125 is directed. As an example, scanner 120 may include two scanning mirrors configured to scan the output beam 125 across a 600 horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternately, the pixels may have a particular nonuniform distribution (e.g., the pixels may be distributed across all or a portion of the 60°×20° FOR, and the pixels may have a higher density in one or more particular regions of the 60°×20° FOR).

In particular embodiments, a light source 110 may emit pulses of light which are scanned by scanner 120 across a FOR of lidar system 100. One or more of the emitted pulses of light may be scattered by a target 130 located downrange from the lidar system 100, and a receiver 140 may detect at least a portion of the pulses of light scattered by the target 130. In particular embodiments, receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions). Receiver 140 may have an active region or an avalanche-multiplication region that includes silicon, germanium, or InGaAs. The active region of receiver 140 may have any suitable size, such as for example, a diameter or width of approximately 20-500 µm.

In particular embodiments, receiver 140 may include circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more characteristics (e.g., rising edge, falling edge, amplitude, or duration) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, a lidar system 100 may be used to determine the distance to one or more downrange targets 130. By scanning the lidar system 100 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 600 horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within afield of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

In particular embodiments, one or more lidar systems 100 may be integrated into a vehicle. As an example, multiple lidar systems 100 may be integrated into a car to provide a complete 360-degree horizontal FOR around the car. As another example, 4-10 lidar systems 100, each system having a 45-degree to 90-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

Although this disclosure describes or illustrates example embodiments of lidar systems 100 or light sources 110 that produce light waveforms that include pulses of light, the embodiments described or illustrated herein may also be applied to other types of light waveforms, including continuous-wave (CW) light or modulated light waveforms. For example, a lidar system 100 as described or illustrated herein may include a light source 110 configured to produce pulses of light. Alternatively, a lidar system 100 may be configured to act as a frequency-modulated continuous-wave (FMCW) lidar system and may include a light source 110 configured to produce CW light or a frequency-modulated light waveform.

A pulsed lidar system is one type of lidar system 100 in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered from a remote target) relative to the modulation frequency of the emitted light. For example, for a linearly chirped light source (e.g., a frequency modulation that produces a linear change in frequency with time), the larger the frequency difference between the emitted light and the received light, the farther away the target 130 is located. The frequency difference can be determined by mixing the received light with a portion of the emitted light (e.g., by coupling the two beams onto a detector, or mixing analog electric signals corresponding to the received light and the emitted light) and determining the resulting beat frequency. For example, the electrical signal from an APD can be analyzed using a fast Fourier transform (FFT) technique to determine the frequency difference between the emitted light and the received light.

If a linear frequency modulation m (e.g., in units of Hz/s) is applied to a CW laser, then the distance D from the target 130 to the lidar system 100 may be expressed as D=c·Δf/(2m), where c is the speed of light and Δf is the difference in frequency between the transmitted light and the received light. For example, for a linear frequency modulation of $10^{12}$ Hz/s (or, 1 MHz/μs), if a frequency difference of 330 kHz is measured, then the distance to the target is approximately 50 meters. Additionally, a frequency difference of 1.33 MHz corresponds to a target located approximately 200 meters away.

The light source 110 for a FMCW lidar system can be a fiber laser (e.g., a seed laser diode followed by one or more optical amplifiers) or a direct-emitter laser diode. The seed laser diode or the direct-emitter laser diode can be operated in a CW manner (e.g., by driving the laser diode with a substantially constant DC current), and the frequency modulation can be provided by an external modulator (e.g., an electro-optic phase modulator). Alternatively, the frequency modulation can be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) can have any suitable frequency or shape (e.g., piecewise linear, sinusoidal, triangle-wave, or sawtooth).

Figure 2:
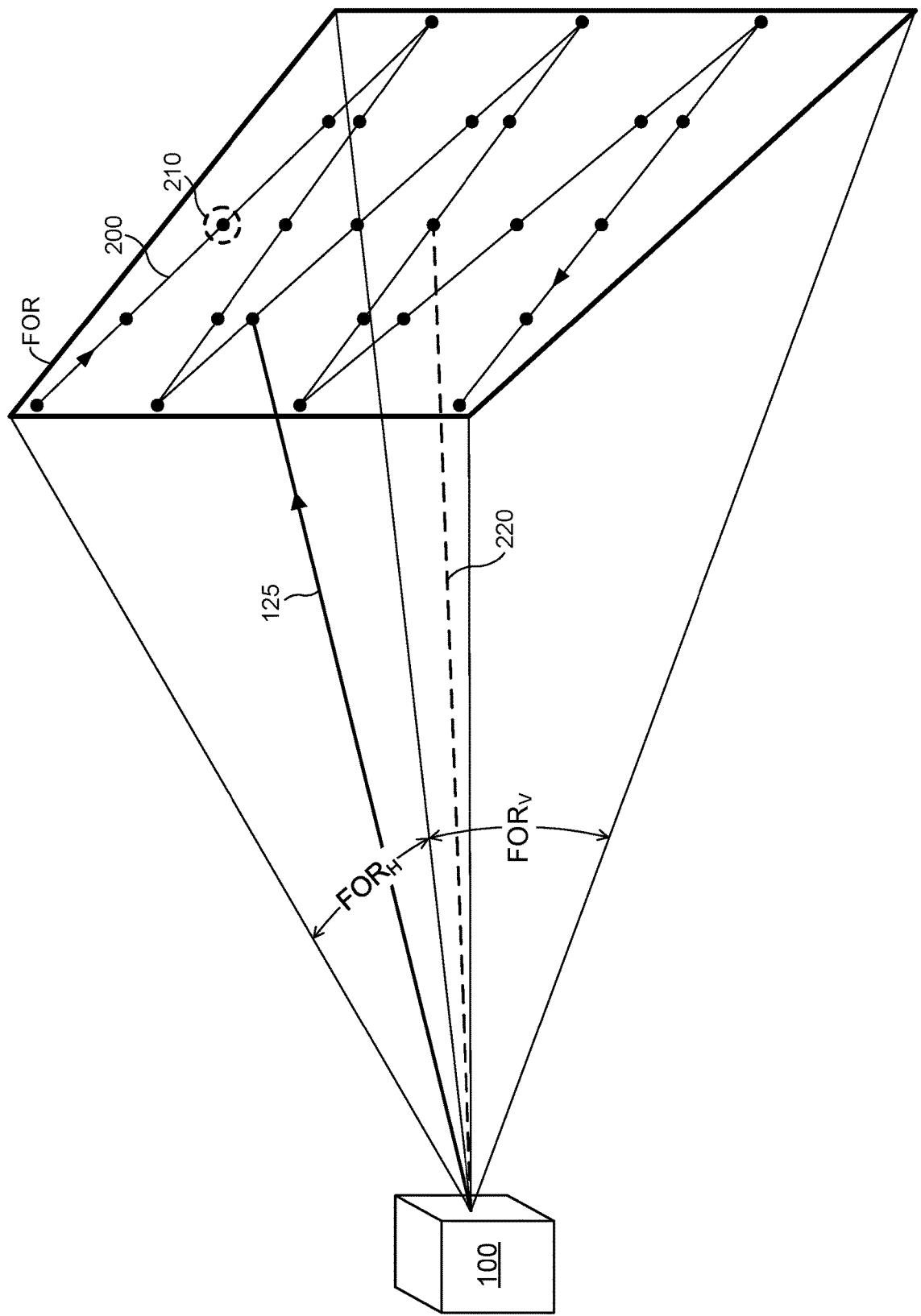
FIG. 2 illustrates an example scan pattern produced by a lidar system.

FIG. 2 illustrates an example scan pattern 200 produced by a lidar system 100. A scan pattern 200 (which may be referred to as a scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses and one or more corresponding distance measurements. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
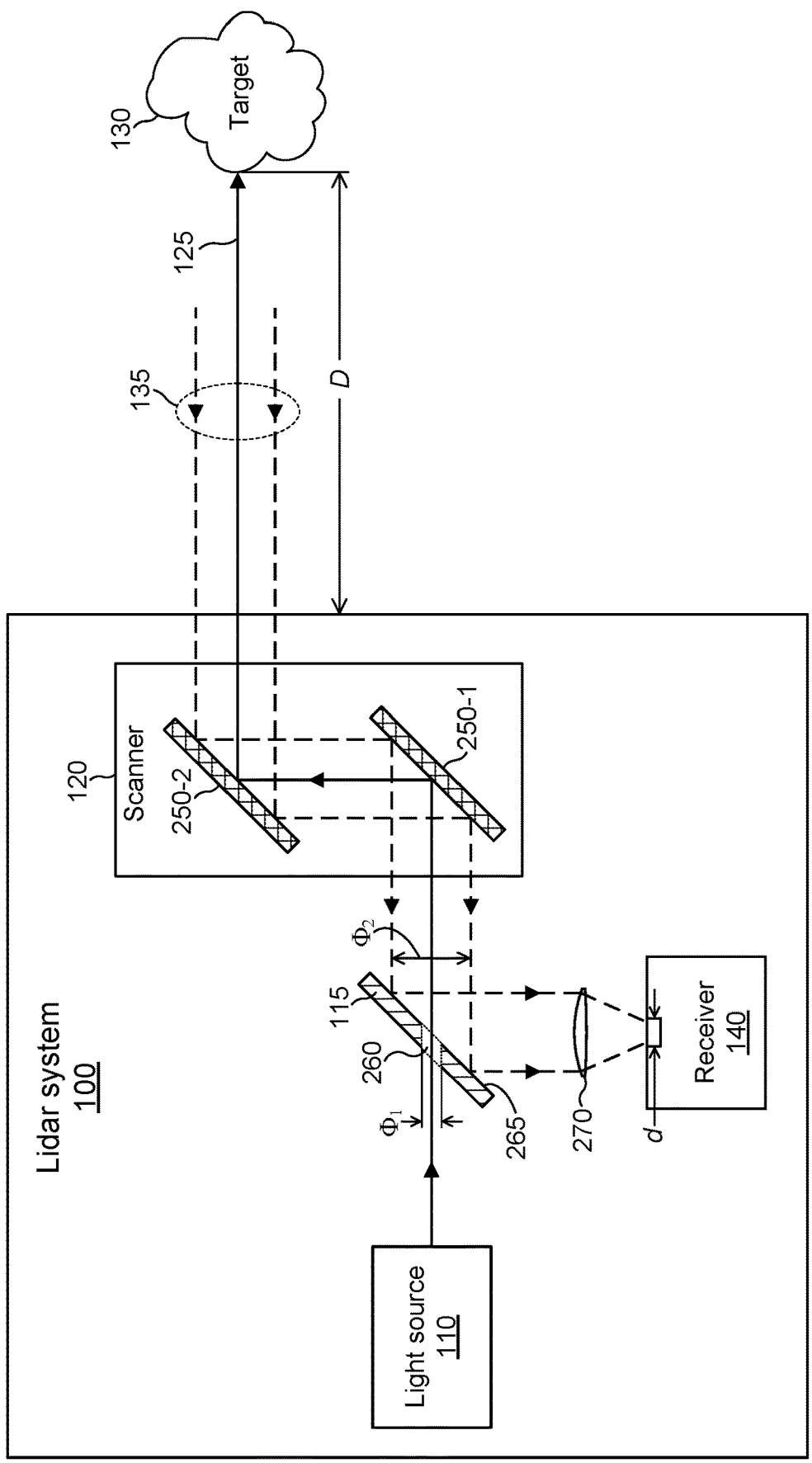
FIG. 3 illustrates an example lidar system with an example overlap mirror.

FIG. 3 illustrates an example lidar system 100 with an example overlap mirror 115. In particular embodiments, a lidar system 100 may include a light source 110 configured to emit pulses of light and a scanner 120 configured to scan at least a portion of the emitted pulses of light across a field of regard. As an example, the light source 110 may include a pulsed solid-state laser or a pulsed fiber laser, and the optical pulses produced by the light source 110 may be directed through aperture 260 of overlap mirror 115 and then coupled to scanner 120. In particular embodiments, a lidar system 100 may include a receiver 140 configured to detect at least a portion of the scanned pulses of light scattered by a target 130 located a distance D from the lidar system 100. As an example, one or more pulses of light that are directed downrange from lidar system 100 by scanner 120 (e.g., as part of output beam 125) may scatter off a target 130, and a portion of the scattered light may propagate back to the lidar system 100 (e.g., as part of input beam 135) and be detected by receiver 140.

In particular embodiments, lidar system 100 may include one or more processors (e.g., controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to a maximum range $R_{MAX}$ of the lidar system 100. In particular embodiments, a maximum range (which may be referred to as a maximum distance) of a lidar system 100 may refer to the maximum distance over which the lidar system 100 is configured to sense or identify targets 130 that appear in a field of regard of the lidar system 100. The maximum range of lidar system 100 may be any suitable distance, such as for example, 25 m, 50 m, 100 m, 200 m, 500 m, or 1 km. As an example, a lidar system 100 with a 200-m maximum range may be configured to sense or identify various targets 130 located up to 200 m away from the lidar system 100. For a lidar system 100 with a 200-m maximum range ($R_{MAX}$=200 m), the time of flight corresponding to the maximum range is approximately $2 \cdot R_{MAX}/c \approx 1.33$ μs.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, overlap mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 1400 nm and approximately 2100 nm. As an example, lidar system 100 may include a laser with an operating wavelength between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 1530 nm and approximately 1560 nm. As another example, lidar system 100 may be a Class 1 or Class I laser product that includes a fiber laser or solid-state laser with an operating wavelength between approximately 1400 nm and approximately 1600 nm.

In particular embodiments, scanner 120 may include one or more mirrors, where each mirror is mechanically driven by a galvanometer scanner, a resonant scanner, a MEMS device, a voice coil motor, an electric motor, or any suitable combination thereof. A galvanometer scanner (which may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror is rotated back and forth using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate. An electric motor, such as for example, a brushless DC motor or a synchronous electric motor, may be used to continuously rotate a mirror at a substantially fixed frequency (e.g., a rotational frequency of approximately 1 Hz, 10 Hz, 50 Hz, 100 Hz, 500 Hz, or 1,000 Hz). The mirror may be continuously rotated in one rotation direction (e.g., clockwise or counter-clockwise relative to a particular rotation axis). As an example, a polygon mirror may be mechanically coupled to a DC motor which is configured to spin the polygon mirror at a rotational speed of approximately 160 Hz (or, 9600 revolutions per minute (RPM)). A polygon mirror may refer to a multi-sided object having a reflective surface on each of its sides or faces. As an example, a polygon mirror may include any suitable number of faces (e.g., 2, 3, 4, 5, 6, 7, 8, or 10 faces), where each face includes a reflective surface. As another example, a four-sided polygon mirror may have four reflective surfaces (e.g., one reflective surface on each of its four faces).

In particular embodiments, a scanner 120 may include any suitable number of mirrors driven by any suitable number of mechanical actuators. As an example, a scanner 120 may include a single mirror configured to scan an output beam 125 along a single direction (e.g., a scanner 120 may be a one-dimensional scanner that scans along a horizontal or vertical direction). The mirror may be driven by one actuator (e.g., a galvanometer) or two actuators configured to drive the mirror in a push-pull configuration. As another example, a scanner 120 may include a single mirror that scans an output beam 125 along two directions (e.g., horizontal and vertical). The mirror may be driven by two actuators, where each actuator provides rotational motion along a particular direction or about a particular axis. As another example, a scanner 120 may include two mirrors, where one mirror scans an output beam 125 along a substantially horizontal direction and the other mirror scans the output beam 125 along a substantially vertical direction. In the example of FIG. 3, scanner 120 includes two mirrors, mirror 250-1 and mirror 250-2. Mirror 250-1 may scan output beam 125 along a substantially horizontal direction, and mirror 250-2 may scan the output beam 125 along a substantially vertical direction (or vice versa).

In particular embodiments, a scanner 120 may include two mirrors, where each mirror is driven by a corresponding galvanometer scanner. As an example, scanner 120 may include a galvanometer actuator that scans mirror 250-1 along a first direction (e.g., vertical), and scanner 120 may include another galvanometer actuator that scans mirror 250-2 along a second direction (e.g., horizontal). In particular embodiments, a scanner 120 may include two mirrors, where one mirror is driven by a galvanometer actuator and the other mirror is driven by a resonant actuator. As an example, a galvanometer actuator may scan mirror 250-1 along a first direction, and a resonant actuator may scan mirror 250-2 along a second direction. The first and second scanning directions may be substantially orthogonal to one another. As an example, the first direction may be substantially vertical, and the second direction may be substantially horizontal, or vice versa. In particular embodiments, a scanner 120 may include two mirrors, where one mirror is driven by a DC motor and the other mirror is driven by a galvanometer actuator. As an example, mirror 250-1 may be a polygon mirror that is spun about a fixed axis by a DC motor, and mirror 250-2 may be driven by a galvanometer actuator. In particular embodiments, a scanner 120 may include two mirrors, where both mirrors are driven by electric motors. As an example, mirror 250-1 may be a polygon mirror driven by an electric motor, and mirror 250-2 may be driven by another electric motor. In particular embodiments, a scanner 120 may include one mirror driven by two actuators which are configured to scan the mirror along two substantially orthogonal directions. As an example, one mirror may be driven along a substantially horizontal direction by a resonant actuator or a galvanometer actuator, and the mirror may also be driven along a substantially vertical direction by a galvanometer actuator. As another example, a mirror may be driven along two substantially orthogonal directions by two resonant actuators or by two electric motors.

In particular embodiments, a scanner 120 may include a mirror configured to be scanned along one direction by two actuators arranged in a push-pull configuration. Driving a mirror in a push-pull configuration may refer to a mirror that is driven in one direction by two actuators. The two actuators may be located at opposite ends or sides of the mirror, and the actuators may be driven in a cooperative manner so that when one actuator pushes on the mirror, the other actuator pulls on the mirror, and vice versa. As an example, a mirror may be driven along a horizontal or vertical direction by two voice coil actuators arranged in a push-pull configuration. In particular embodiments, a scanner 120 may include one mirror configured to be scanned along two axes, where motion along each axis is provided by two actuators arranged in a push-pull configuration. As an example, a mirror may be driven along a horizontal direction by two resonant actuators arranged in a horizontal push-pull configuration, and the mirror may be driven along a vertical direction by another two resonant actuators arranged in a vertical push-pull configuration.

In particular embodiments, a scanner 120 may include two mirrors which are driven synchronously so that the output beam 125 is directed along any suitable scan pattern 200. As an example, a galvanometer actuator may drive mirror 250-2 with a substantially linear back-and-forth motion (e.g., the galvanometer may be driven with a substantially sinusoidal or triangle-shaped waveform) that causes output beam 125 to trace a substantially horizontal back-and-forth pattern. Additionally, another galvanometer actuator may scan mirror 250-1 along a substantially vertical direction. For example, the two galvanometers may be synchronized so that for every 64 horizontal traces, the output beam 125 makes a single trace along a vertical direction. As another example, a resonant actuator may drive mirror 250-2 along a substantially horizontal direction, and a galvanometer actuator or a resonant actuator may scan mirror 250-1 along a substantially vertical direction.

In particular embodiments, a scanner 120 may include one mirror driven by two or more actuators, where the actuators are driven synchronously so that the output beam 125 is directed along a particular scan pattern 200. As an example, one mirror may be driven synchronously along two substantially orthogonal directions so that the output beam 125 follows a scan pattern 200 that includes substantially straight lines. In particular embodiments, a scanner 120 may include two mirrors driven synchronously so that the synchronously driven mirrors trace out a scan pattern 200 that includes substantially straight lines. As an example, the scan pattern 200 may include a series of substantially straight lines directed substantially horizontally, vertically, or along any other suitable direction. The straight lines may be achieved by applying a dynamically adjusted deflection along a vertical direction (e.g., with a galvanometer actuator) as an output beam 125 is scanned along a substantially horizontal direction (e.g., with a galvanometer or resonant actuator). If a vertical deflection is not applied, the output beam 125 may trace out a curved path as it scans from side to side. By applying a vertical deflection as the mirror is scanned horizontally, a scan pattern 200 that includes substantially straight lines may be achieved. In particular embodiments, a vertical actuator may be used to apply both a dynamically adjusted vertical deflection as the output beam 125 is scanned horizontally as well as a discrete vertical offset between each horizontal scan (e.g., to step the output beam 125 to a subsequent row of a scan pattern 200).

In the example of FIG. 3, lidar system 100 produces an output beam 125 and receives light from an input beam 135. The output beam 125, which includes at least a portion of the pulses of light emitted by light source 110, may be scanned across a field of regard. The input beam 135 may include at least a portion of the scanned pulses of light which are scattered by one or more targets 130 and detected by receiver 140. In particular embodiments, output beam 125 and input beam 135 may be substantially coaxial. The input and output beams being substantially coaxial may refer to the beams being at least partially overlapped or sharing a common propagation axis so that input beam 135 and output beam 125 travel along substantially the same optical path (albeit in opposite directions). As output beam 125 is scanned across a field of regard, the input beam 135 may follow along with the output beam 125 so that the coaxial relationship between the two beams is maintained.

In particular embodiments, a lidar system 100 may include an overlap mirror 115 configured to overlap the input beam 135 and output beam 125 so that they are substantially coaxial. In FIG. 3, the overlap mirror 115 includes a hole, slot, or aperture 260 which the output beam 125 passes through and a reflecting surface 265 that reflects at least a portion of the input beam 135 toward the receiver 140. The overlap mirror 115 may be oriented so that input beam 135 and output beam 125 are at least partially overlapped. In particular embodiments, input beam 135 may pass through a lens 270 which focuses the beam onto an active region of the receiver 140. The active region may refer to an area over which receiver 140 may receive or detect input light. The active region may have any suitable size or diameter d, such as for example, a diameter of approximately 25 μm, 50 μm, 80 μm, 100 μm, 200 μm, 500 μm, 1 mm, 2 mm, or 5 mm. In particular embodiments, overlap mirror 115 may have a reflecting surface 265 that is substantially flat or the reflecting surface 265 may be curved (e.g., mirror 115 may be an off-axis parabolic mirror configured to focus the input beam 135 onto an active region of the receiver 140). A reflecting surface 265 (which may be referred to as a reflective surface 265) may include a reflective metallic coating (e.g., gold, silver, or aluminum) or a reflective dielectric coating, and the reflecting surface 265 may have any suitable reflectivity R at an operating wavelength of the light source 110 (e.g., R greater than or equal to 70%, 80%, 90%, 95%, 98%, or 99%).

In particular embodiments, aperture 260 may have any suitable size or diameter $\Phi_1$, and input beam 135 may have any suitable size or diameter $\Phi_2$, where $\Phi_2$ is greater than $\Phi_1$. As an example, aperture 260 may have a diameter $\Phi_1$ of approximately 0.2 mm, 0.5 mm, 1 mm, 2 mm, 3 mm, 5 mm, or 10 mm, and input beam 135 may have a diameter $\Phi_2$ of approximately 2 mm, 5 mm, 10 mm, 15 mm, 20 mm, 30 mm, 40 mm, or 50 mm. In particular embodiments, reflective surface 265 of overlap mirror 115 may reflect greater than or equal to 70% of input beam 135 toward the receiver 140. As an example, if reflective surface 265 has a reflectivity R at an operating wavelength of the light source 110, then the fraction of input beam 135 directed toward the receiver 140 may be expressed as $R \times [1-(\Phi_1/\Phi_2)^2]$. For example, if R is 95%, $\Phi_1$ is 2 mm, and $\Phi_2$ is 10 mm, then approximately 91% of input beam 135 may be directed toward the receiver 140 by reflective surface 265.

Figure 4:
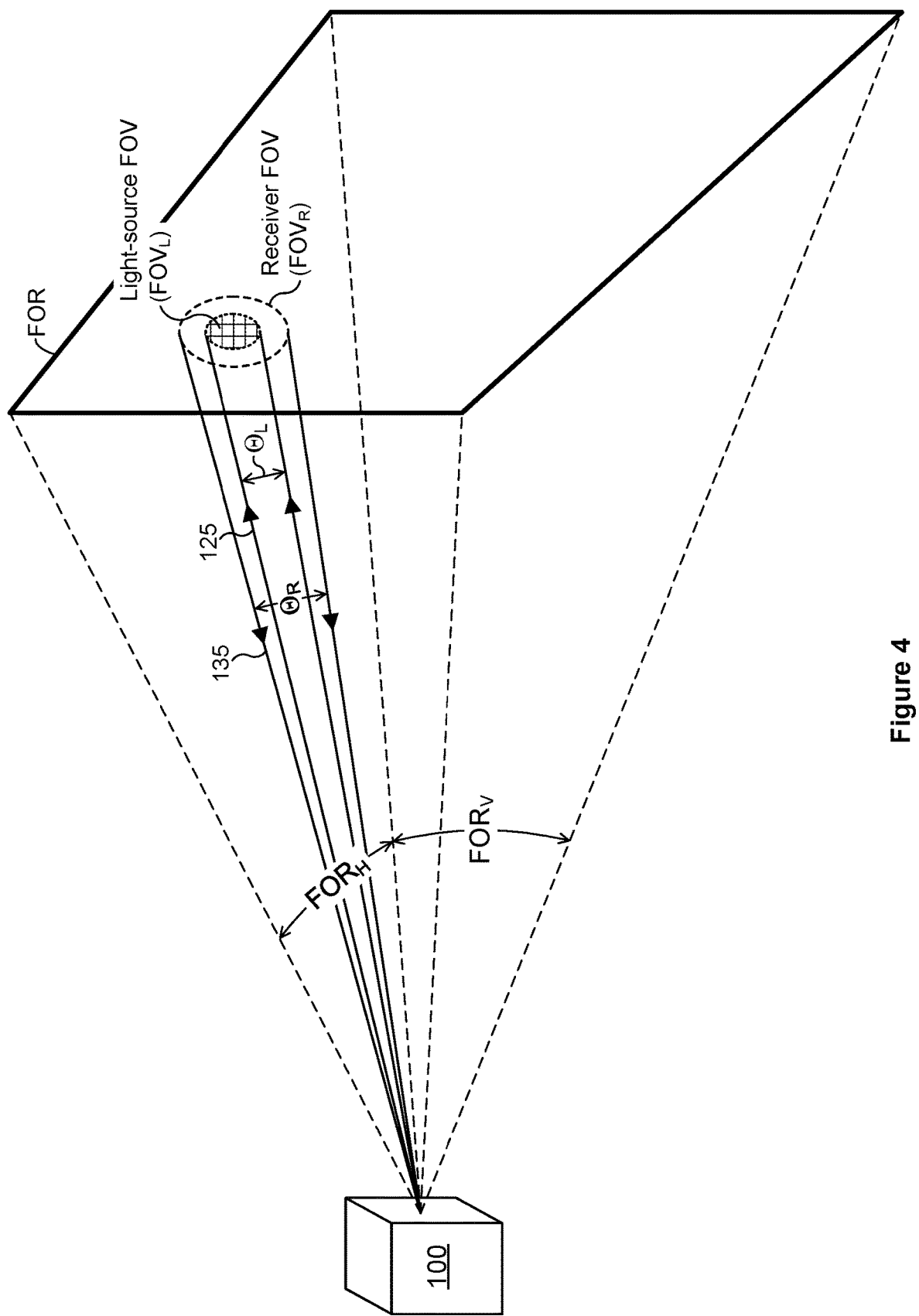
FIG. 4 illustrates an example light-source field of view and receiver field of view for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent OR that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 3 mrad. In particular embodiments, the receiver field of view may be larger than the light-source field of view, or the light-source field of view may be larger than the receiver field of view. As an example, $\Theta_L$ may be approximately equal to 1.5 mrad, and $\Theta_R$ may be approximately equal to 3 mrad.

In particular embodiments, a pixel 210 may represent or may correspond to a light-source field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
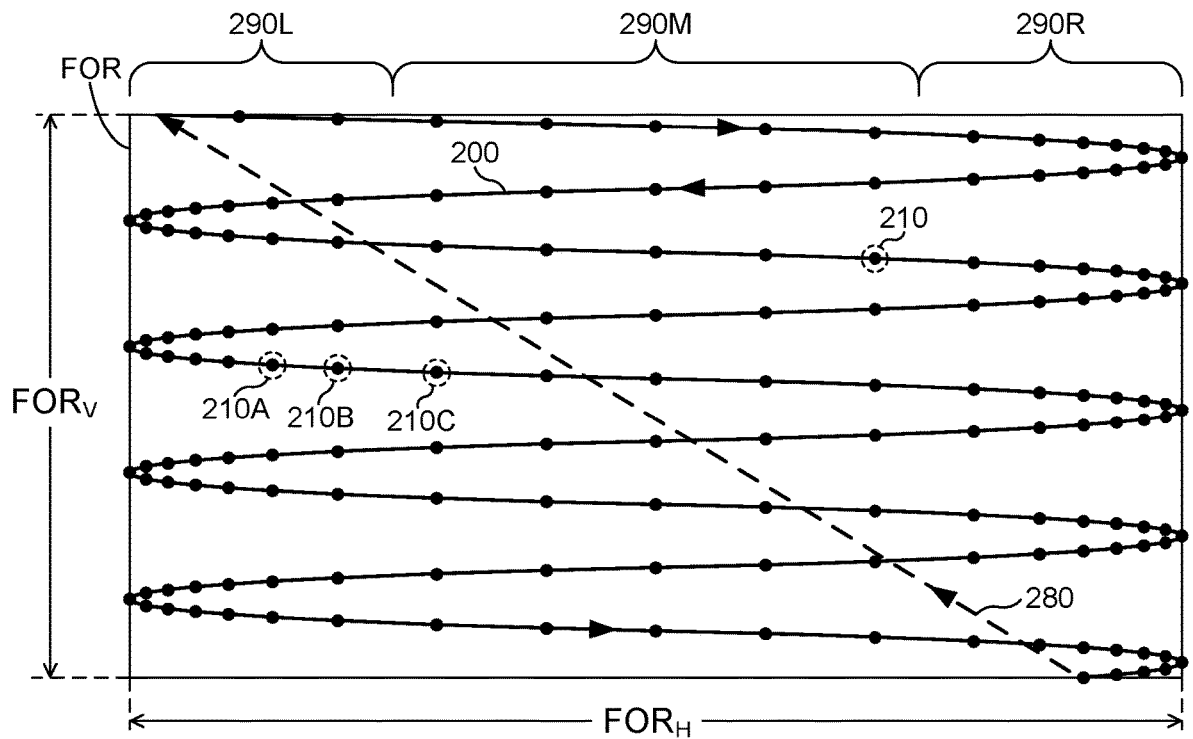
FIG. 5 illustrates an example sinusoidal scan pattern.

FIG. 5 illustrates an example sinusoidal scan pattern 200. In particular embodiments, a scan pattern 200 may be a closed or continuous scan pattern 200 that continually scans without performing a retrace operation, or a scan pattern 200 may be an open scan pattern 200 that includes a retrace. A retrace operation may occur when scanner 120 resets from an end point of a scan 200 back to a starting point of the scan 200. In particular embodiments, lidar system 100 may not send out pulses or acquire distance data during a retrace, or lidar system 100 may acquire distance data during a retrace (e.g., a retrace path may include one or more pixels 210). In the example of FIG. 5, scan pattern 200 includes retrace 280 represented by a dashed diagonal line that connects the end of scan pattern 200 to the beginning.

In particular embodiments, the pixels 210 of a scan pattern 200 may be substantially evenly spaced with respect to time or angle. As an example, each pixel 210 (and its associated pulse) may be separated from an immediately preceding or following pixel 210 by any suitable time interval, such as for example a time interval of approximately 0.5 µs, 1.0 µs, 1.4 µs, or 2.0 µs. In FIG. 5, pixels 210A, 210B, and 210C may be associated with pulses that were emitted with a 1.6 µs fixed time interval between the pulses. As another example, each pixel 210 (and its associated pulse) may be separated from an immediately preceding or following pixel 210 by any suitable angle, such as for example an angle of approximately 0.01°, 0.02°, 0.05°, 0.1°, 0.2°, 0.3°, or 0.5°. In FIG. 5, pixels 210A and 210B may have an angular separation of approximately 0.10 (e.g., pixels 210A and 210B may each be associated with optical beams separated by an angle of 0.1°). In particular embodiments, the pixels 210 of a scan pattern 200 may have an adjustable spacing with respect to time or angle. As an example, a time interval or angle separating two successive pixels 210 may be dynamically varied during a scan or from one scan to a subsequent scan.

In particular embodiments, lidar system 100 may include a scanner 120 configured to direct output beam 125 along any suitable scan pattern 200. As an example, all or part of scan pattern 200 may follow a substantially sinusoidal path, triangle-wave path, square-wave path, sawtooth path, piecewise linear path, periodic-function path, or any other suitable path or combination of paths. In the example of FIG. 5, scan pattern 200 corresponds to an approximately sinusoidal path, where pixels 210 are arranged along a sinusoidal curve. In particular embodiments, scan pattern 200 may include any suitable integral number of cycles of a particular periodic function (e.g., 1, 2, 5, 10, 20, 50, or 100 cycles) or any suitable non-integral number of cycles (e.g., 9.7, 13.33, or 53.5 cycles). In FIG. 5, scan pattern 200 includes just over four periods or cycles of a sinusoidal function. In particular embodiments, scan pattern 200 may include a periodic function having any suitable alignment or orientation, such as for example, horizontal, vertical, oriented at 33 degrees, or oriented along a 45-degree axis. In the example of FIG. 5, scan pattern 200 is a sinusoidal curve oriented horizontally where the peaks and valleys of the sinusoidal curve are aligned substantially horizontally.

In particular embodiments, pixels 210 may be substantially evenly distributed across scan pattern 200, or pixels 210 may have a distribution or density that varies across a FOR of scan pattern 200. In the example of FIG. 5, pixels 210 have a greater density toward the left edge 290L and right edge 290R of scan 200, and the pixel density in the middle region 290M of scan 200 is lower compared to the edges. As an example, pixels 210 may be distributed so that ≥40% of the pixels 210 are located in the left 25% of the FOR of scan pattern 200 (e.g., region 290L), ≥40% of the pixels 210 are located in the right 25% of the FOR (e.g., region 290R), and the remaining <20% of the pixels 210 are located in the middle 50% of the FOR (e.g., region 290M). In particular embodiments, a time interval or angle between pixels 210 may be dynamically adjusted during a scan so that a scan pattern 200 has a particular distribution of pixels 210 (e.g., a higher density of pixels 210 in one or more particular regions). As an example, the scan pattern 200 may be configured to have a higher density of pixels 210 in a middle or central region of scan 200 or toward one or more edges of scan 200 (e.g., a middle region or a left, right, upper, or lower edge that includes approximately 5%, 10%, 20%, 30%, or any other suitable percentage of the FOR of scan pattern 200). For example, pixels 210 may be distributed so that ≥40% of the pixels 210 are located in a central, left, or right region of scan pattern 200 with the remaining <60% of the pixels 210 distributed throughout the rest of scan pattern 200. As another example, a scan pattern 200 may have a higher density of pixels along a right edge of the scan pattern 200 than along a left edge of the scan pattern 200.

In particular embodiments, a distribution of pixels 210 in a scan pattern 200 may be determined, at least in part, by a pulse period of light source 110, a scanning speed provided by scanner 120, or a shape or path followed by scan pattern 200. As an example, the pulse period of light source 110 may be a substantially fixed value, or the pulse period may be adjusted dynamically during a scan to vary the density of pixels 210 across the scan region. As another example, an angular speed with which the scanner 120 rotates may be substantially fixed or may vary during a scan. As another example, a scan pattern 200 may provide for a varying distribution of pixels 210 based on the shape of the pattern. For example, a triangle-wave scan pattern 200 (combined with a substantially constant pulse period and angular speed) may provide a substantially uniform distribution of pixels 210 along the horizontal direction, while a sinusoidal scan pattern 200 may result in a higher density of pixels 210 along the left edge 290L and right edge 290R and a lower density of pixels 210 in the middle region 290M. Additionally, two or more scan parameters may be selected or adjusted to optimize or adjust the density of pixels 210 in a scan pattern 200. As an example, a sinusoidal scan pattern 200 may be combined with a dynamically adjusted pulse period of light source 100 to provide for a higher density of pixels 210 along the right edge 290R and a lower density of pixels 210 in the middle region 290M and left edge 290L.

In particular embodiments, a particular scan pattern 200 may be repeated from one scan to the next, or one or more parameters of a scan pattern 200 may be adjusted or varied from one scan to another. As an example, a time interval or angle between pixels 210 may be varied from one scan to another scan. A relatively long time interval may be applied in an initial scan to produce a moderate-density point cloud, and a relatively short time interval may be applied in a subsequent scan to produce a high-density point cloud. As another example, a time interval or angle between pixels 210 may be varied within a particular scan pattern 200. For a particular region of a scan pattern 200, a time interval may be decreased to produce a higher density of pixels 210 within that particular region.

Figure 6:
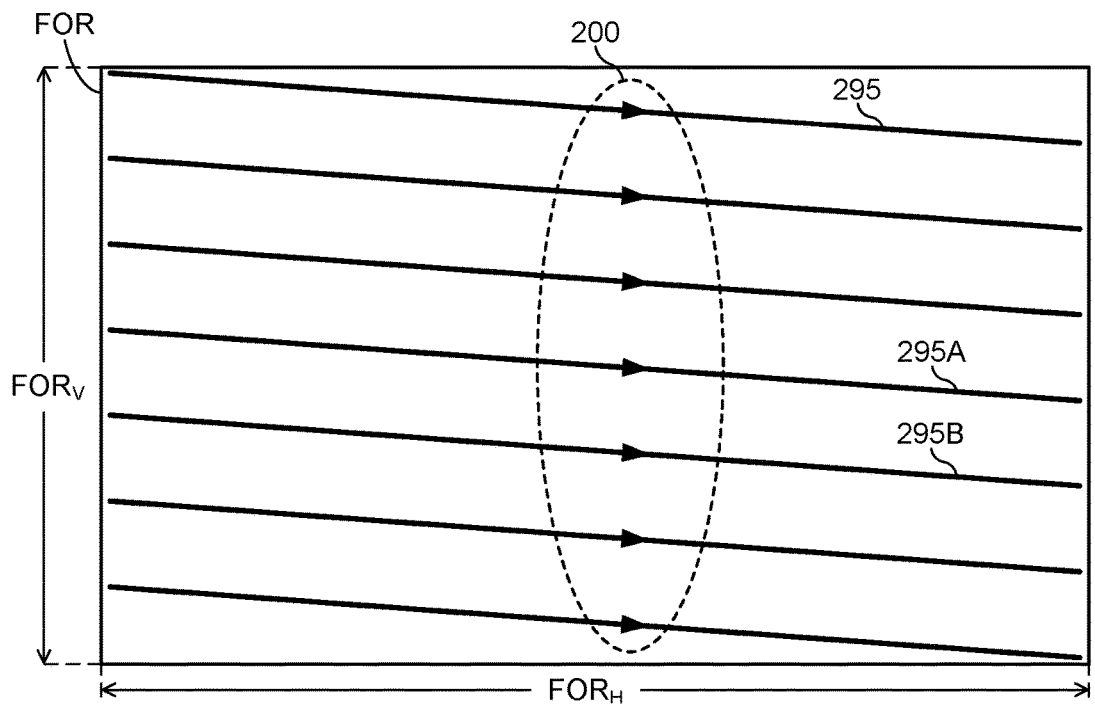
FIG. 6 illustrates an example unidirectional scan pattern.

FIG. 6 illustrates an example unidirectional scan pattern 200. The example unidirectional scan pattern 200 in FIG. 6 includes seven scan lines 295, where each scan line 295 represents a scan of output beam 125 along a single direction (e.g., approximately from left to right) across the FOR. The scan pattern 200 illustrated in FIG. 5 may be referred to as a bidirectional scan pattern 200 where the output beam 125 is alternately scanned in two opposite directions (e.g., scanning alternately from left to right and then from right to left). In particular embodiments, a unidirectional scan pattern 200 may include any suitable number of scan lines 295 (e.g., 2, 5, 10, 25, 50, 100, 200, or 500 scan lines 295). In particular embodiments, the scan lines 295 of a unidirectional scan pattern 200 may be oriented to scan output beam 125 along any suitable direction (e.g., left to right, right to left, top to bottom, or bottom to top). In particular embodiments, a unidirectional scan pattern 200 may be implemented using a scanner 120 that includes a rotating polygon mirror. As an example, mirror 250-1 in FIG. 3 may be a rotating polygon mirror having multiple reflective faces. As the polygon mirror 250-1 rotates, the output beam 125 is successively reflected from each reflective face of the polygon mirror, and each reflective face causes the output beam 125 to be scanned along one scan line 295 of a unidirectional scan pattern 200. In FIG. 6, one reflective face of a polygon mirror may produce scan line 295A, and an adjacent reflective face may produce the next scan line 295B.

Figure 7:
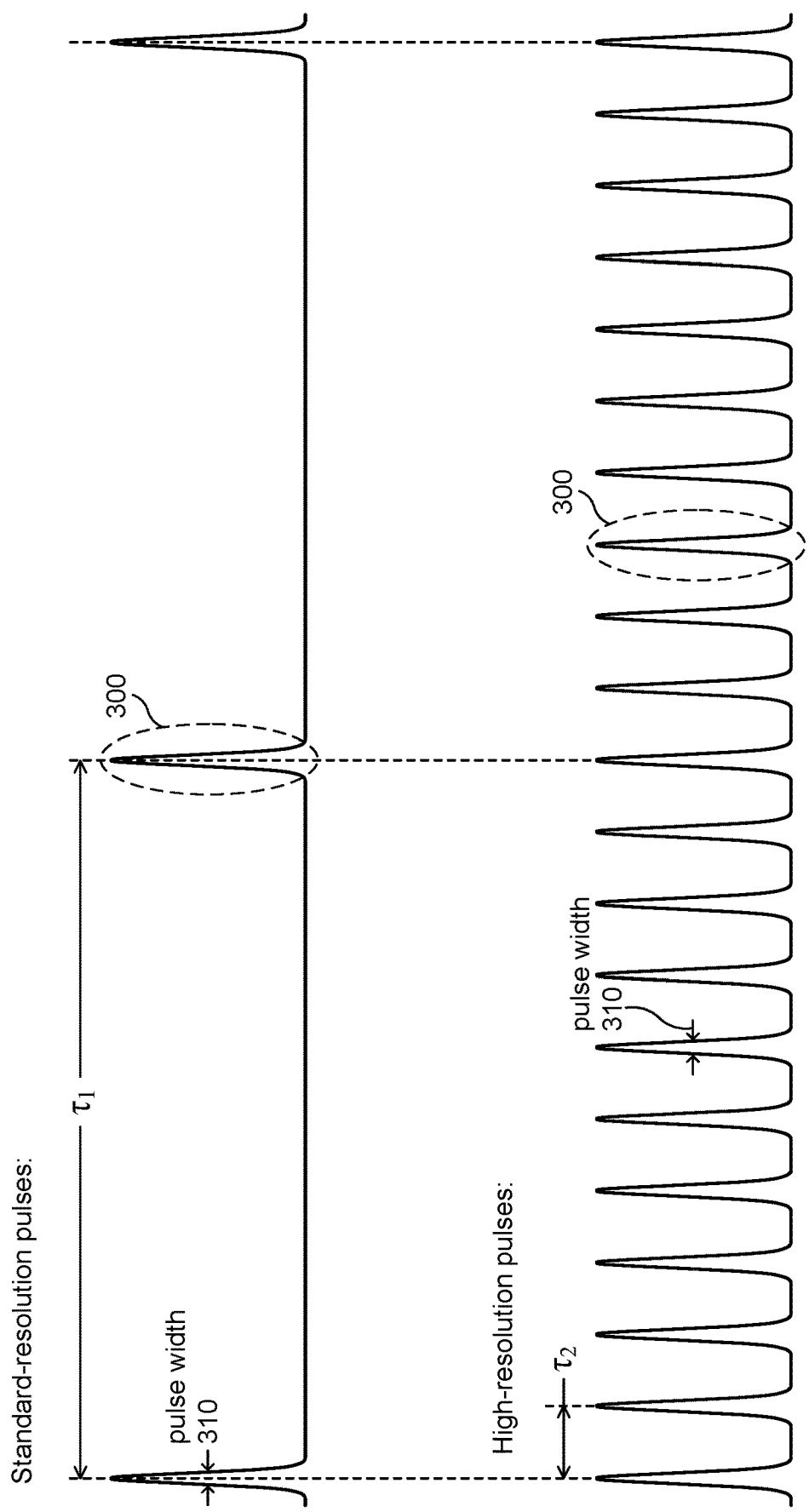
FIG. 7 illustrates an example series of standard-resolution pulses and an example series of high-resolution pulses.

FIG. 7 illustrates an example series of standard-resolution optical pulses 300 and an example series of high-resolution optical pulses 300. In particular embodiments, light source 110 of lidar system 100 may be operated in two or more modes, where each operating mode has a particular period or pulse repetition frequency. As an example, light source 110 may operate in three modes by producing alternating series of standard-resolution pulses, medium-resolution pulses, and high-resolution pulses. As another example, light source 110 may operate in two modes and produce alternating series of standard-resolution pulses and high-resolution pulses (e.g., a repeating pattern that includes a series of standard-resolution pulses followed by a series of high-resolution pulses).

In particular embodiments, light source 110 may emit one or more series of standard-resolution optical pulses alternating with one or more series of high-resolution optical pulses. As an example, lidar system 100 may perform a scan of a field of regard using a series of standard-resolution pulses (e.g., the standard-resolution series may include approximately $10^5$ optical pulses 300), and then lidar system 100 may perform a subsequent scan using a series of high-resolution pulses (e.g., the high-resolution series may include approximately 106 optical pulses 300). As another example, lidar system 100 may perform one scan of a field of regard using one series of standard-resolution pulses, and then lidar system 100 may perform multiple scans of the field of regard using multiple respective series of high-resolution pulses. As illustrated by the pulse train in the upper portion of FIG. 7, a series of standard-resolution pulses may include multiple pulses having a standard pulse period of $\tau_1$. As illustrated by the pulse train in the lower portion of FIG. 7, a series of high-resolution pulses may include multiple pulses having a high-resolution pulse period of $\tau_2$. In particular embodiments, a lidar system 100 that performs scans using a combination of standard-resolution pulses and high-resolution pulses may be referred to as a lidar system with an adjustable or variable pulse period or as a lidar system with an adjustable or variable pulse repetition frequency.

In particular embodiments, a period or pulse period (T) may refer to a duration of time between consecutive pulses, and a pulse repetition frequency may be expressed as the reciprocal of the pulse period (e.g., $1/\tau$). As an example, a pulse period of 1.5 µs corresponds to a pulse repetition frequency of approximately 667 kHz. In particular embodiments, pulses 300 may have a pulse width 310 (which may be referred to as a pulse duration) of approximately 100 ps, 200 ps, 400 ps, 1 ns, 2 ns, 5 ns, 10 ns, 20 ns, 50 ns, 100 ns, or any other suitable pulse width 310. As an example, pulses 300 in a series of standard-resolution pulses and a series of high-resolution pulses may have approximately the same pulse width 310 (e.g., 300-400 µs). As another example, pulses 300 in a series of standard-resolution pulses may have a pulse width 310 of approximately 2 ns, and pulses 300 in a series of high-resolution pulses may have a shorter pulse width 310 (e.g., 300-500 ps).

In particular embodiments, high-resolution pulses may have a shorter pulse period than standard-resolution pulses. Similarly, the high-resolution pulses may have a higher pulse repetition frequency than the standard-resolution pulses. As an example, the standard pulse period $\tau_1$ may be approximately 500 ns to 2 µs (corresponding to a pulse repetition frequency of approximately 500 kHz to 2 MHz), and the high-resolution pulse period $\tau_2$ may be approximately 50 ns to 500 ns (corresponding to a pulse repetition frequency of approximately 2 MHz to 20 MHz). As another example, the high-resolution pulse period $\tau_2$ may be less than the standard pulse period $\tau_1$ (e.g., $\tau_2$ may be less than or equal to one half of $\tau_1$). As another example, the standard pulse period $\tau_1$ may be approximately 1.3 µs, and the high-resolution pulse period $\tau_2$ may be approximately 100-200 ns. In the example of FIG. 7, the standard pulse period $\tau_1$ is approximately 10 times (or 10×) the high-resolution pulse period $\tau_2$. In particular embodiments, the standard pulse period $\tau_1$ may be approximately 2×, 3×, 5×, 10×, 20×, or any other suitable factor greater than the high-resolution pulse period $\tau_2$. In particular embodiments, the standard pulse period $\tau_1$ may be greater than the high-resolution pulse period $\tau_2$ by an integral factor (e.g., 8×) or a non-integral factor (e.g., 5.5× or 9.67×).

In particular embodiments, a standard pulse period $\tau_1$ or a high-resolution pulse period $\tau_2$ may be fixed to particular values, or a standard pulse period $\tau_1$ or a high-resolution pulse period $\tau_2$ may be varied. As an example, the standard pulse period $\tau_1$ may be fixed to approximately 1.6 µs, and the high-resolution pulse period $\tau_2$ may be fixed to approximately 320 ns. As another example, the standard pulse period $\tau_1$ may be fixed to approximately 1.6 µs, and the high-resolution pulse period $\tau_2$ may be dynamically adjusted, either while scanning a single frame or from one frame scan to another. For example, the high-resolution pulse period $\tau_2$ may be dynamically adjusted to a value between approximately 200 and 500 ns. The lidar system 100 may apply a high-resolution pulse period $\tau_2$ of 200-300 ns when performing a scan or a portion of a scan that requires a relatively high density of pixels, and a pulse period $\tau_2$ of 300-600 ns may be used for scans or portions of a scan where a lower pixel density is satisfactory.

In particular embodiments, the standard pulse period $\tau_1$ may be based at least in part on a round-trip time associated with a maximum range of lidar system 100. In particular embodiments, a maximum range (which may be referred to as a maximum distance) of a lidar system 100 may refer to the maximum distance over which the lidar system 100 is configured to sense or identify targets 130 that appear in a field of regard of the lidar system 100. As an example, the maximum range $D_{max}$ of a lidar system 100 may be approximately 50 m to 1 km. As another example, a lidar system 100 may be configured to sense or identify various targets 130 located up to 200 m away from the lidar system 100, and the maximum range of the lidar system 100 may be approximately 200 m. As another example, a lidar system 100 may determine a distance from the lidar system 100 to a target 130, where the target 130 is located within a maximum range of the lidar system 100. In particular embodiments, the standard pulse period may be based on a round-trip time $T_{max}$ associated with the maximum range $D_{max}$, where the round-trip time may be expressed as $T_{max}=2D_{max}/c$. As an example, the standard pulse period $\tau_1$ may be greater than or equal to the round-trip time $T_{max}$. As another example, the standard pulse period $\tau_1$ may be approximately equal to the round-trip time associated with $D_{max}$ plus a buffer time $\beta$, so that $\tau_1=2D_{max}/c+\beta$. In particular embodiments, the buffer time $\beta$ may be approximately equal to 0 µs, 10 µs, 100 µs, 1 ns, 10 ns, 100 ns, 150 ns, 200 ns, 500 ns, or any other suitable buffer time. As an example, if $D_{max}$ is 200 m, then the round-trip time associated with $D_{max}$ is approximately 1.33 µs. If the buffer time $\beta$ is 230 ns, then the standard pulse period $\tau_1$ is approximately 1.56 µs, which corresponds to a pulse repetition frequency of $1/\tau_1 \cong 641$ kHz. If there is no buffer time (e.g., the buffer time $\beta$ is zero), then the standard pulse period $\tau_1$ is approximately 1.33 µs, which corresponds to a pulse repetition frequency of approximately 752 kHz. In particular embodiments, the buffer time $\beta$ may be approximately equal to 0%, 1%, 2%, 5%, 10%, or 20% of the round-trip time $2D_{max}/c$. As an example, if the round-trip time associated with $D_{max}$ is approximately 1.33 µs and the buffer time $\beta$ is 5% of the round-trip time, then the standard pulse period $\tau_1$ is approximately 1.40 µs (corresponding to a pulse repetition frequency of approximately 714 kHz).

In particular embodiments, a lidar system 100 may repeatedly alternate between transmitting series of pulses having different periods. As an example, lidar system 100 may alternate between emitting one or more series of standard-resolution pulses followed by one or more series of high-resolution pulses. In particular embodiments, lidar system 100 may transmit one or more series of standard-resolution pulses (e.g., as represented by the upper portion of FIG. 7) to capture a standard-resolution point cloud across a particular field of regard, and then the lidar system 100 may transmit one or more series of high-resolution pulses (e.g., as represented by the lower portion of FIG. 7) to capture a high-resolution point cloud across all or a portion of the particular field of regard. A high-resolution point cloud may be determined from the one or more series of high-resolution pulses and from a standard-resolution point cloud or distance values associated with standard-resolution pulses. As an example, lidar system 100 may emit approximately 64,000 pulses while scanning across a 60°×15° FOR and operating in standard-resolution mode. Additionally, the lidar system 100 may operate with a 10× pulse repetition frequency in high-resolution mode and may emit approximately 640,000 pulses while scanning across the same 60°×15° FOR in high-resolution mode to produce a point cloud with a 10 times higher density of pixels 210. As another example, lidar system 100 may scan a 60°×15° FOR in standard-resolution mode with a pulse repetition frequency of approximately 700 kHz, and then, the lidar system 100 may scan a 6°×3° high-resolution scan region of the FOR with a pulse repetition frequency of approximately 3.5 MHz.

In particular embodiments, lidar system 100 may capture a standard-resolution point cloud that reveals a target 130 located at least partially within a portion of the scanned field of regard, and the lidar system 100 may then capture a high-resolution point cloud of the portion of the field of regard that includes the target 130. As an example, a previous scan may reveal a target 130 located at a particular distance or a particular set of azimuth and altitude coordinates, and a subsequent scan may include a high-resolution scan region over which a high-resolution scan of the target 130 may be performed. In particular embodiments, information from a previous scan may be used to dynamically adjust the scan parameters for a subsequent scan. As an example, the location or size of a high-resolution scan region may be based on the location or size of a target 130 determined from a previous scan or based on motion information for the target 130 or the lidar system 100. In particular embodiments, a high-resolution scan region may have approximately the same size or orientation as the region where a target 130 was located in a previous scan. As an example, if the target 130 and the lidar system 100 are stationary or are moving at approximately the same speed and direction, then a high-resolution scan region may be located in approximately the same place where the target 130 was located in a previous scan. In particular embodiments, a high-resolution scan region may be moved or resized to account for motion of the lidar system 100 or motion of the target 130. For example, if the target 130 is stationary (e.g., a pothole or road-surface marking) and the lidar system 100 is moving (e.g., the lidar system 100 is part of a moving vehicle), then the high-resolution scan region may be positioned to account for the motion of the vehicle between the previous frame and the subsequent frame. As another example, if both the lidar system 100 and the target 130 are moving (e.g., if the lidar system 100 is part of a moving vehicle and the target 130 is another moving vehicle), then the size or the location of the high-resolution scan region may be determined based at least in part on the relative motion of the target 130 and the lidar system 100.

In particular embodiments, the pulse energy of optical pulses produced by light source 110 may be adjusted as the pulse repetition frequency (or pulse period) of light source 110 is varied. As an example, the pulse energy and the pulse repetition frequency of output beam 125 may vary approximately inversely so that as the repetition frequency of light source 110 is increased, the pulse energy decreases. As another example, the pulse energy and the pulse period of output beam 125 may vary approximately proportionally so that as the pulse period of the pulses emitted by light source 110 is decreased, the pulse energy also decreases. As another example, light source 110 may produce standard-resolution pulses at a repetition frequency of approximately 700 kHz, and the pulses may have a pulse energy of approximately 2 µJ. Additionally, the light source 110 may produce high-resolution pulses at a repetition frequency of 2.8 MHz (which is 4 times greater than the standard-resolution repetition frequency), and the corresponding pulses may have a pulse energy of approximately 0.5 µJ (which is 4 times smaller than the standard-resolution pulse energy).

In particular embodiments, the average optical power of output beam 125 may remain substantially constant as the pulse energy and pulse repetition frequency of light source 110 are varied. As an example, standard-resolution optical pulses with a 2-µJ pulse energy and a 700-kHz repetition frequency have an average optical power of approximately 1.4 W, where the average optical power may be determined from the product of pulse energy and pulse repetition frequency. Similarly, high-resolution optical pulses with a 0.5-µJ pulse energy and a 2.8-MHz repetition frequency also have an average optical power of approximately 1.4 W.

In particular embodiments, a light source 110 where the pulse energy and pulse repetition frequency vary approximately inversely may be achieved by adjusting an operating parameter of the light source 110. As an example, a pulse width, pulse repetition frequency, seed-laser power or current, or pump-laser power or current may be dynamically adjusted so that the pulse energy decreases as the pulse repetition frequency is increased. In particular embodiments, a light source 110 with approximately inverse variation between pulse energy and pulse repetition frequency may be based at least in part on actively varying the light-source pulse repetition frequency. As an example, light source 110 may include a fiber laser with a pulsed laser diode followed by one or more fiber-optic amplifiers, and the pulse repetition frequency of the laser diode may be varied to adjust the corresponding pulse repetition frequency of the light source 110. As the pulse repetition frequency of the laser diode increases, the pulse energy of the optical pulses emitted by the light source 110 may decrease since the fiber-optic amplifiers may provide less optical gain to each optical pulse. The reduced optical gain may result from the fiber-optic amplifiers having less time for gain recovery between each of the higher-repetition-rate optical pulses.

In particular embodiments, a light source 110 where the pulse energy and pulse repetition frequency vary approximately inversely may ensure that lidar system 100 operates in an eye-safe manner as the light-source pulse repetition frequency is varied. As an example, when performing a high-resolution scan of a portion of a FOR, the pulse energy may be decreased so that the lidar system 100 continues to operate as an eye-safe system. For a relatively close target 130, the repetition rate may be increased to provide a higher density of pixels 210 that produces a more detailed image of the target 130. This high-density scan may be performed using lower-energy optical pulses which may ensure that the lidar system 100 operates in an eye-safe manner. Additionally, since the target 130 is relatively close, the lower-energy pulses may provide sufficient energy for scattered light from the target 130 to be detected by receiver 140.

In particular embodiments, lidar system 100 may transmit one or more series of standard-resolution pulses to capture a standard-resolution point cloud across a particular field of regard, and the lidar system 100 may also transmit one or more series of hybrid-resolution pulses. As an example, a series of hybrid-resolution pulses may include a combination of standard-resolution pulses and high-resolution pulses and may result in a hybrid-resolution point cloud that includes one or more standard-resolution regions corresponding to the standard-resolution pulses and one or more high-resolution regions corresponding to the high-resolution pulses. The hybrid-resolution point cloud may include one or more regions of relatively low interest where standard-resolution pulses are used and one or more high-interest regions where high-resolution pulses are used. For example, a standard-resolution point cloud may indicate the presence of one or more targets 130 located within one or more respective regions of the scanned field of regard, and a subsequent hybrid-resolution scan may use high-resolution pulses to obtain higher-density point clouds in the regions where the targets 130 are located and may use standard-resolution pulses away from the targets 130. In particular embodiments, a region of a scanned field of regard may refer to a section or area of the scanned field of regard that is scanned with a particular type of pulses (e.g., standard-resolution pulses or high-resolution pulses). A region may have any suitable size or shape (e.g., substantially square, rectangular, circular, or elliptical). In particular embodiments, a particular region may encompass all or part of a corresponding target 130.

In particular embodiments, lidar system 100 may perform dynamically updated hybrid-resolution scans that include a series of hybrid-resolution scans, where one or more scan parameters for a subsequent hybrid-resolution scan may be updated based on the results of one or more previous hybrid-resolution scans. As an example, a dynamically updated hybrid-resolution scan may include one or more regions where high-resolution pulses or standard-resolution pulses are used, and the high-resolution or standard-resolution regions may be modified in a subsequent scan as one or more targets 130 approach or recede from the lidar system 100 or move with respect to the lidar system 100. With a dynamically updated hybrid-resolution scan process, a region that is scanned with high-resolution pulses may be scanned in a subsequent scan with standard-resolution pulses as the distance to a target 130 located in that region increases beyond a particular threshold distance $D_{th}$. Similarly, a region may be scanned with standard-resolution pulses until a target 130 located in that region gets within a distance $D_{th}$ of the lidar system 100, at which point the region may be scanned with high-resolution pulses.

In particular embodiments, a hybrid-resolution scan may use high-resolution pulses to scan one or more regions associated with distance measurements that are less than a particular threshold distance $D_{th}$, and standard-resolution pulses may be used to scan one or more other regions associated with distance measurements that are greater than or equal to $D_{th}$. As an example, high-resolution pulses may be used to scan a region that includes a target 130 located within a distance $D_{th}$ of lidar system 100, and standard-resolution pulses may be used in other regions having associated distance measurements greater than $D_{th}$. In particular embodiments, a threshold distance Dh for a hybrid-resolution scan may be any suitable value, such as for example 10 m, 20 m, 50 m, or 100 m. As an example, a lidar system 100 with a maximum range $D_{max}$ of 200 m may have a threshold distance Dh that is approximately 75 m (e.g., one or more targets 130 located within 75 m of the lidar system 100 may be scanned with high-resolution pulses, and other scan regions located away from those targets 130 may be scanned with standard-resolution pulses). As another example, a lidar system 100 with a maximum range $D_{max}$ may have a threshold distance $D_{th}$ that is approximately $D_{max}/2$, $D_{max}/3$, $D_{max}/4$, or any other suitable fraction of $D_{max}$.

Figure 8:
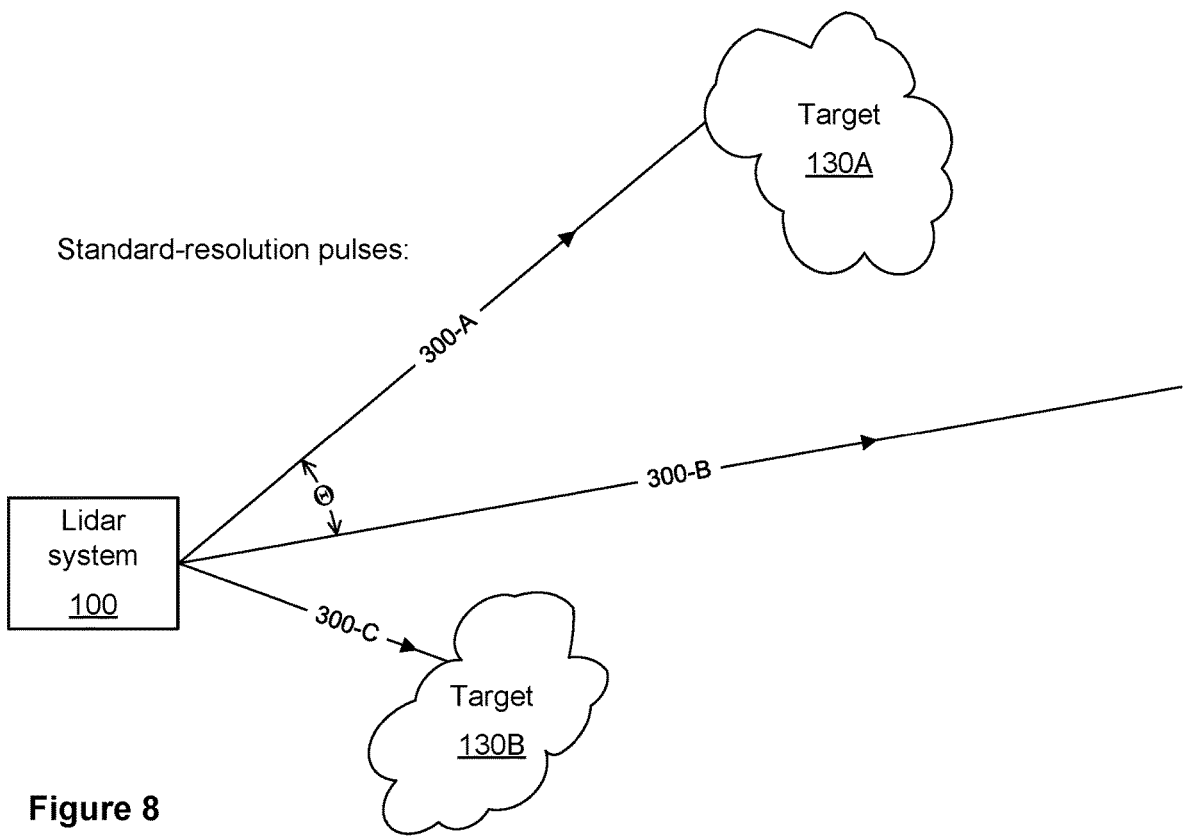
FIG. 8 illustrates an example lidar system operating with standard-resolution pulses.

FIG. 8 illustrates an example lidar system 100 operating with standard-resolution pulses. In the example of FIG. 8, beam paths associated with three standard-resolution pulses (300-A, 300-B, and 300-C) are shown, and adjacent beam paths have an angular separation of Θ. As an example, if the lidar system 100 samples 1,000 pixels horizontally across a 60° FOR, then the angular separation Θ between consecutive horizontal pixels is approximately 0.06°. As another example, if the lidar system 100 samples 64 pixels vertically across a 15° FOR, the angular separation Θ between consecutive vertical pixels is approximately 0.23°. In particular embodiments, lidar system 100 may operate with any suitable horizontal or vertical angular separation Θ, such as for example, an angular separation of 0.01°, 0.05°, 0.1°, 0.5°, or 1°. In FIG. 8, pulse 300-A is incident on target 130A, pulse 300-B does not encounter a target, and pulse 300-C is incident on target 130B.

Figure 9:
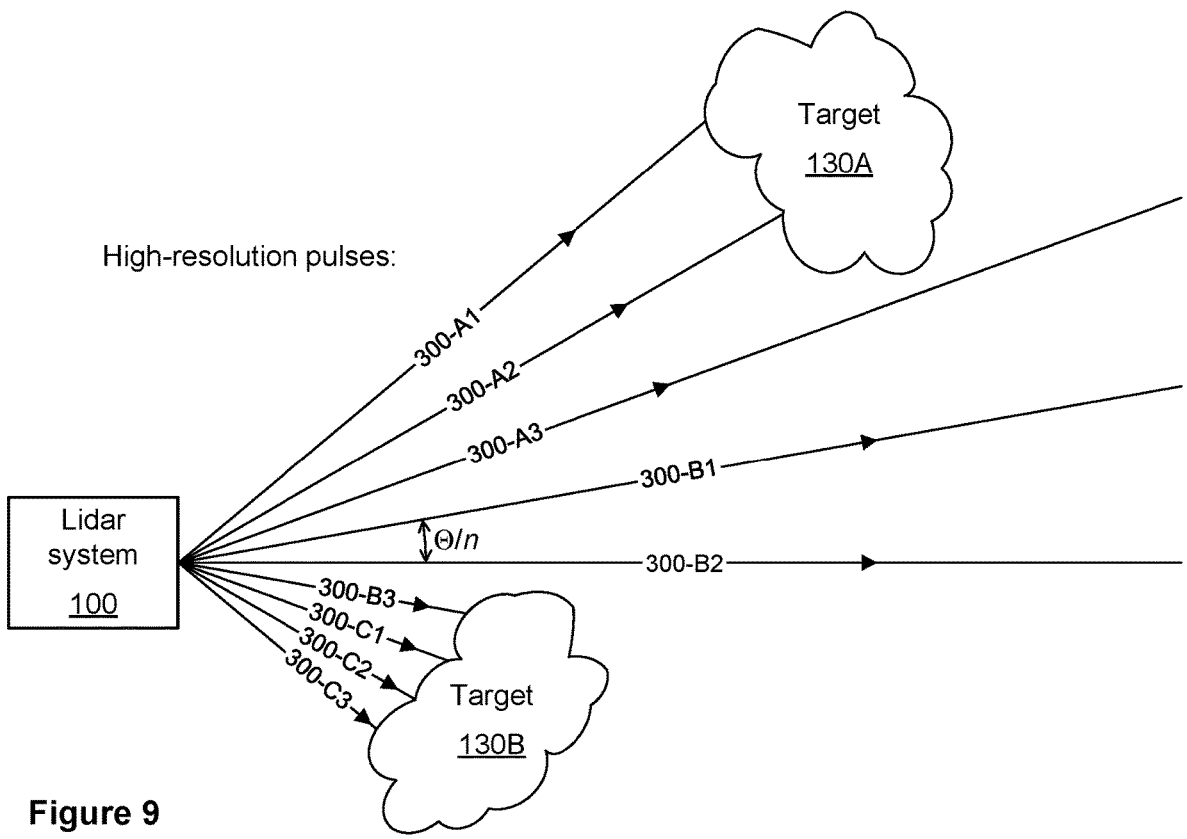
FIG. 9 illustrates an example lidar system operating with high-resolution pulses.

FIG. 9 illustrates an example lidar system operating with high-resolution pulses. In the example of FIG. 9, the high-resolution pulses have a pulse period $\tau_2$ that is one-third the pulse period $\tau_1$ of the standard-resolution pulses of FIG. 8 (e.g., each standard-resolution pulse corresponds to three high-resolution pulses). In FIG. 9, beam paths associated with nine high-resolution pulses (300-A1, 300-A2, 300-A3, 300-B1, 300-B2, 300-B3, 300-C1, 300-C2, and 300-C3) are shown. The beam paths have an angular separation of Θ/n, where n may be determined from the ratio $\tau_1/\tau_2$ or a ratio of high-resolution pulses to standard-resolution pulses. In FIG. 9, n is 3 since there are three high-resolution pulses for each standard resolution pulse, and the angular separation between beam paths is Θ/3. As an example, if the angular separation Θ between consecutive standard-resolution pixels in FIG. 8 is 0.06°, then the angular separation Θ/n between consecutive high-resolution pixels in FIG. 9 is 0.02°. In FIG. 9, pulses 300-A1 and 300-A2 are incident on target 130A, pulses 300-A3, 300-B1, and 300-B2 do not encounter a target, and pulses 300-B3, 300-C1, 300-C2, and 300-C3 are incident on target 130B.

Figure 10:
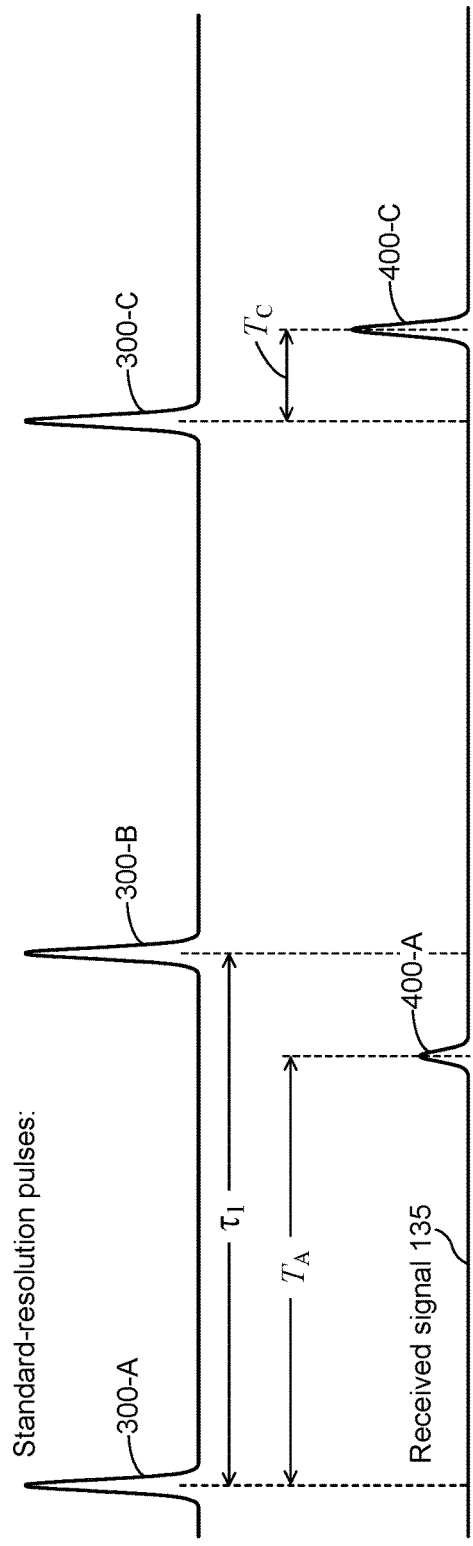
FIG. 10 illustrates an example series of standard-resolution pulses (based on FIG. 8) and a corresponding example received signal.

FIG. 10 illustrates an example series of standard-resolution pulses (based on FIG. 8) and a corresponding example received signal 135. The received signal 135 of FIG. 10 includes received pulse 400-A (which results from the scattering of pulse 300-A from target 130A) and received pulse 400-C (which results from the scattering of pulse 300-C from target 130B). There is no return pulse detected from outgoing pulse 300-B since that pulse does not encounter a target 130. In particular embodiments, a scan based on a series of standard-resolution pulses may be used to determine a ground-truth point cloud in which each pixel is associated with an unambiguous or absolute distance from lidar system 100. As an example, pulse 300-A (along with its associated scattered pulse 400-A) may be associated with a distance of 160 m, and pulse 300-C (along with its associated scattered pulse 400-C) may be associated with a distance of 40 m. The time $T_A$ between transmitted pulse 300-A and received pulse 400-A (e.g., the time of flight of pulse 300-A) may be 1.067 μs, corresponding to a distance of approximately 160 m. The time Tc between transmitted pulse 300-C and received pulse 400-C (e.g., the time of flight of pulse 300-C) may be 267 ns, corresponding to a distance of approximately 40 m. If the maximum range is 200 m, then pulse 300-B may be associated with a distance of >200 m since no scattered pulse was received within the pulse period $\tau_1$ (where pulse period $\tau_1$ is based on the maximum range). The standard-resolution scan illustrated in FIGS. 3 and 5 may be used to determine that target 130A is located approximately 160 m from lidar system 100 and target 130B is located approximately 40 m from lidar system 100. Additionally, the standard-resolution scan may be used to determine that there are no targets 130 located within 200 m of the lidar system 100 along the path of pulse 300-B.

Figure 11:
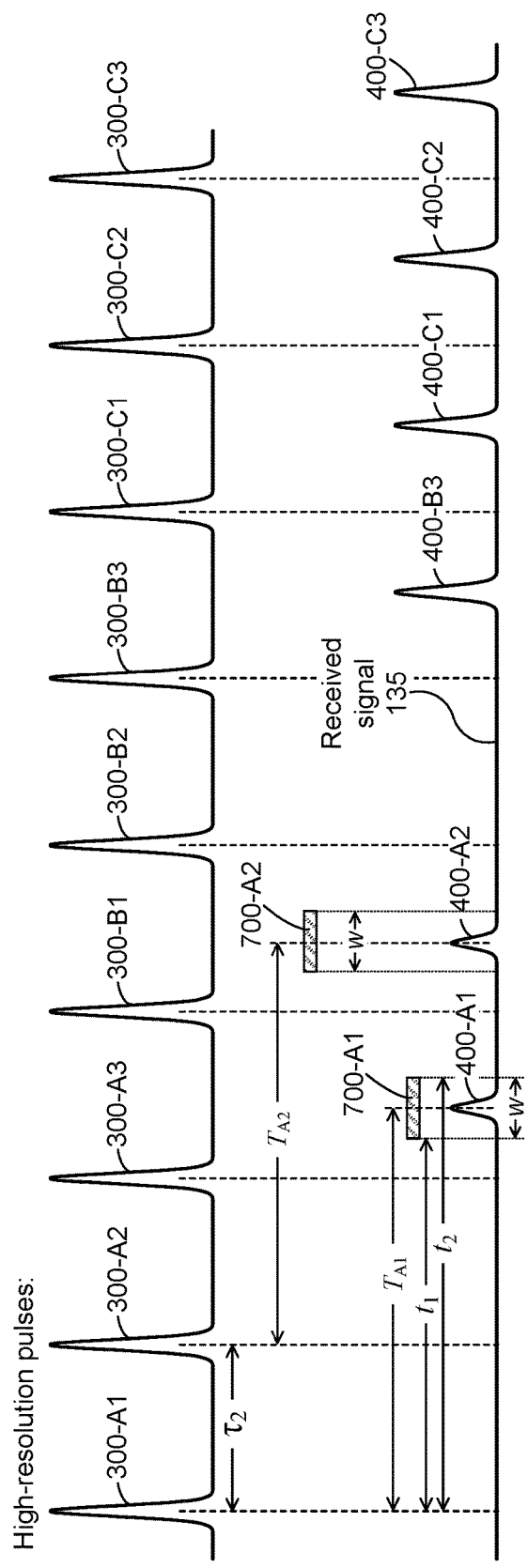
FIG. 11 illustrates an example series of high-resolution pulses (based on FIG. 9) and a corresponding example received signal.

FIG. 11 illustrates an example series of high-resolution pulses (based on FIG. 9) and a corresponding example received signal 135. The received signal 135 of FIG. 11 includes received pulses 400-A1 and 400-A2 (which result from the scattering of pulses 300-A1 and 300-A2, respectively, from target 130A) and received pulses 400-B3, 400-C1, 400-C2, and 400-C3 (which result from the scattering of pulses 300-B3, 300-C1, 300-C2, and 300-C3, respectively, from target 130B). There are no return pulses detected from outgoing pulses 300-A3, 300-B1, and 300-B2 since those pulses do not encounter a target 130 within the maximum range of lidar system 100.

In particular embodiments, lidar system 100 may perform a standard-resolution scan to determine a distance, location, or shape of one or more targets 130. Additionally, lidar system 100 may perform a high-resolution scan in combination with a standard-resolution scan to determine additional or refined information about a distance, location, or shape of one or more targets 130. In particular embodiments, a high-resolution scan may exhibit a temporal overlap between successive outgoing pulses and successive received pulses which may result in a distance or pulse ambiguity. As an example, pulse 400-A1 in FIG. 11 is received after the emission of outgoing pulses 300-A1, 300-A2, and 300-A3, which may lead to an ambiguity as to which of those three outgoing pulses is associated with received pulse 400-A1. In particular embodiments, combining the information from a standard-resolution scan with a high-resolution scan may allow a distance ambiguity to be resolved, resulting in distance, location, or shape information which is free from distance ambiguity. Pulses 300-A and 400-A of the standard-resolution scan indicate the presence of target 130A (e.g., located approximately 160 m from lidar system 100). During the high-resolution scan illustrated in FIG. 11, lidar system 100 may associate received pulses 400-A1 and 400-A2 with emitted pulses 300-A1 and 300-A2, respectively, based on the 160-m distance information (or the associated 1.067 μs time-of-flight information) determined from the previous standard-resolution scan of FIG. 10. In particular embodiments, each standard-resolution pixel in a standard-resolution point cloud may be associated with a standard-resolution distance value. Additionally, an ambiguity in a distance value of a high-resolution point cloud may be resolved based at least in part on one or more standard-resolution distance values.

In particular embodiments, for a particular pulse emitted during a high-resolution scan, a window of time (which may be referred to as a time window) may be defined within which a return pulse is expected to be received. As an example, each emitted pulse of a high-resolution scan may be associated with a respective time window. In the example of FIG. 11, windows 700-A1 and 700-A2 may be defined based on the previously determined 160-m distance information from the standard-resolution scan of FIG. 10. Similar windows (not shown in FIG. 11) associated with the other pulses in FIG. 11 may also be defined based on the information from the standard-resolution scan of FIG. 10. Pulse 400-A1 is received within window 700-A1 and is associated with pulse 300-A1, and pulse 400-A2 is received within window 700-A2 and is associated with pulse 300-A2.

In particular embodiments, a window may have a width w (which may be referred to as a span) that is fixed or that is relative or adjustable. Additionally, a window may have an expected time or center time corresponding to the center or middle of the window. As an example, window 700-A1 may be centered at an expected time of $T_{A1}$ (e.g., $T_{A1}$=1.067 s) after pulse 300-A1 is emitted and may have any suitable fixed width w, such as for example, a fixed width w of 100 μs, 1 ns, 10 ns, or 100 ns with respect to the window center. As another example, window 700-A2 may have a width w that is any suitable percentage of the window center $T_{A2}$, such as for example, 0.5%, 1%, 5%, 10%, or 20% of $T_{A2}$. In particular embodiments, the value of a window center time $T_{A1}$ or $T_{A2}$ may be based on a previously measured time of flight (e.g., $T_A$) from a standard-resolution scan, and the width of a window may represent a time interval within which a return pulse associated with an emitted high-resolution pulse is expected to be received. As an example, a window center time may be based at least in part on distance or time information determined from one or more previous standard-resolution pulses. For example, window center time $T_{A1}$ or $T_{A2}$ may be approximately equal to the time of flight $T_A$ measured for the standard-resolution pulse 300-A. In particular embodiments, a window may be represented by a window start time $t_1$ and a window stop time $t_2$. As an example, start time $t_1$ may be expressed as $t_1=T_{A1}-w/2$, and stop time $t_2$ may be expressed as $t_2=T_{A1}+w/2$, where $T_{A1}$ is the window center time (e.g., the window center time may be based on a time of flight measurement from a previous standard-resolution scan) and w is the window width.

In particular embodiments, a pulse received within a width w of a window may be identified as a valid return pulse associated with an emitted high-resolution pulse that corresponds to the window. Additionally, a pulse received outside of one or more windows may be ignored. The lidar system 100 may associate a received pulse (e.g., pulse 400-A1) that occurs within window 700-A1 with outgoing pulse 300-A1. Similarly, pulse 400-A2, which is received within window 700-A2, may be identified as a valid return pulse associated with emitted pulse 300-A2. Additionally, for a received pulse that occurs outside of windows 700-A1 and 700-A2, the lidar system 100 may not attribute that out-of-window pulse as being associated with pulse 300-A1 or 300-A2. A received pulse that occurs outside of a particular window may be attributed to a different outgoing pulse (e.g., if the received pulse falls within a window associated with that different outgoing pulse). A received pulse that occurs outside of all other previously defined windows may be ignored (e.g., the received pulse may be caused by noise or a spurious reflection).

Figure 12:
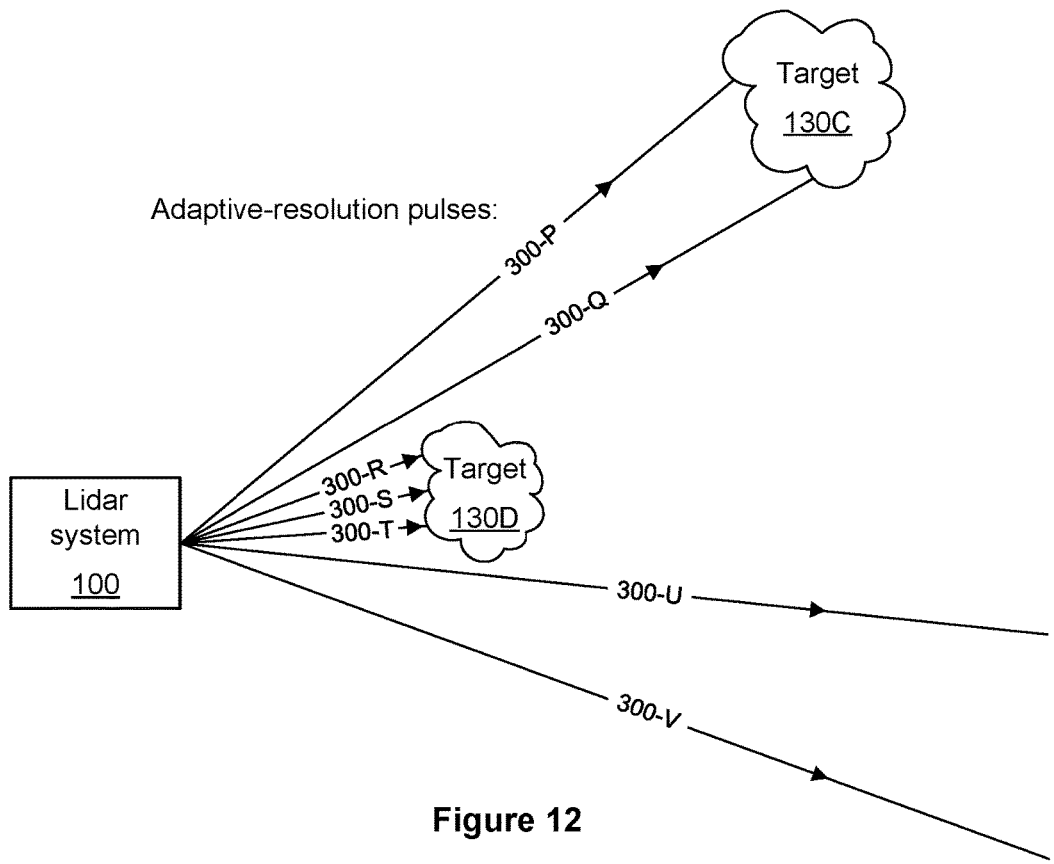
FIG. 12 illustrates an example lidar system operating with adaptive-resolution pulses.

FIG. 12 illustrates an example lidar system 100 operating with adaptive-resolution pulses. In the example of FIG. 12, seven pulses (pulses 300-P, 300-Q, 300-R, 300-S, 300-T, 300-U, and 300-V) are emitted by lidar system 100. Pulses 300-P and 300-Q are incident on (and scattered by) target 130C; pulses 300-R, 300-S, and 300-T are incident on (and scattered by) target 130D; and pulses 300-U and 300-V do not encounter a target. In particular embodiments, lidar system 100 may perform a scan using adaptive-resolution pulses in which the pulse period is varied or adjusted dynamically during the scan based at least in part on the time of flight of one or more pulses. As an example, the pulse period between a first pulse and a subsequent second pulse may be based on a time of flight for the first pulse (e.g., the time to receive a return pulse associated with the first pulse). In FIG. 12, rather than waiting for a particular fixed pulse period to elapse, pulse 300-Q may be emitted just after a return pulse associated with outgoing pulse 300-P is received. Similarly, pulse 300-R may be emitted just after a return pulse associated with outgoing pulse 300-Q is received, and pulse 300-S may be emitted just after a return pulse associated with outgoing pulse 300-R is received. Since target 130D is located closer to lidar system 100 than target 130C, the pulse period between pulses 300-R and 300-S may be shorter than the pulse period between pulses 300-Q and 300-R. If no return pulse is received (e.g., for pulses 300-U and 300-V), then the lidar system 100 may wait for a maximum pulse period $\tau_{max}$ to elapse before sending out a subsequent pulse. As an example, pulse 300-V may be emitted after the maximum pulse period $\tau_{max}$ has elapsed from the emission of pulse 300-U. In particular embodiments, a lidar system 100 that performs scans using adaptive-resolution pulses may be referred to as a lidar system with an adjustable or variable pulse period.

Figure 13:
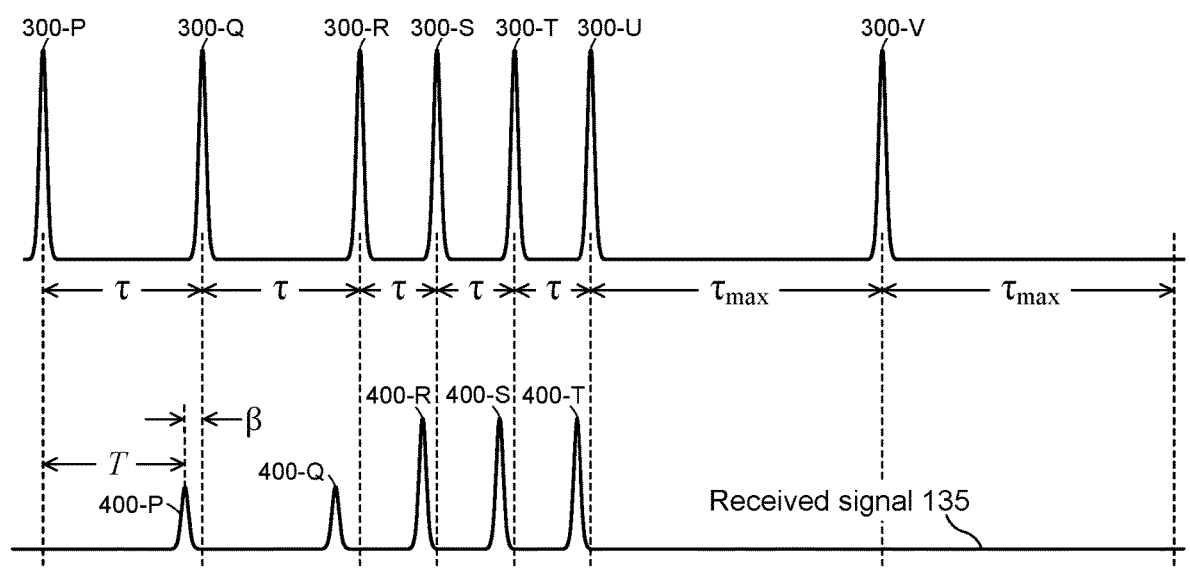
FIG. 13 illustrates an example series of adaptive-resolution pulses (based on FIG. 12) and a corresponding example received signal.

FIG. 13 illustrates an example series of adaptive-resolution pulses (based on FIG. 12) and a corresponding example received signal 135. The received signal 135 of FIG. 13 includes received pulses 400-P and 400-Q (which result from the scattering of pulses 300-P and 300-Q, respectively, from target 130C) and received pulses 400-R, 400-5, and 400-T (which result from the scattering of pulses 300-R, 300-5, and 300-T, respectively, from target 130D). There are no return pulses detected from outgoing pulses 300-U and 300-V since those pulses do not encounter a target 130.

In particular embodiments, a dynamically adjusted pulse period $\tau$ for an adaptive-resolution scan may be approximately equal to $T+\beta$, where T is the time of flight for a previous pulse and R is a buffer time. The time of flight T for a pulse may be expressed as $2D/c$, where D is the distance from lidar system 100 to a target 130 that the pulse is scattered or reflected from and c is the speed of light. In FIG. 13, pulse period $\tau$ between pulses 300-P and 300-Q is equal to $T+\beta$, where T is the time of flight for pulse 300-P and R is a buffer time. The buffer time $\beta$ may represent a delay time, waiting time, or settling time between the receipt of a return pulse (e.g., pulse 400-P) and the emission of the next pulse (e.g., pulse 300-Q). In particular embodiments, the buffer time $\beta$ may be approximately equal to 0 μs, 10 μs, 100 μs, 1 ns, 10 ns, 100 ns, 150 ns, 200 ns, 500 ns, or any other suitable buffer time. As an example, if the time of flight between the emission of pulse 300-P and the receipt of pulse 400-P is 1.0 μs and the buffer time $\beta$ is 50 ns, then the pulse period $\tau$ between pulses 300-P and 300-Q is 1.05 μs. As another example, if the buffer time $\beta$ is 0 μs, then the next pulse (e.g., pulse 300-R) is emitted at substantially the same time as when the incoming pulse 400-Q is received. As another example, the buffer time $\beta$ may represent a time for lidar system 100 to respond to receipt of an incoming pulse. For example, the buffer time $\beta$ may be approximately 5 ns if there is a 5-ns response time between lidar system 100 receiving an incoming pulse and the next outgoing pulse being emitted. In particular embodiments, the buffer time $\beta$ may be approximately equal to 0%, 1%, 2%, 5%, 10%, or 20% of the time of flight T. As an example, if the time of flight T between pulses 300-R and 400-R is 500 ns and the buffer time R is 4% of the time of flight, then the pulse period $\tau$ between pulses 300-R and 300-S is 520 ns.

In particular embodiments, a dynamically adjusted pulse period $\tau$ for an adaptive-resolution scan may be capped so as not to exceed a maximum pulse period $\tau_{max}$. The maximum pulse period may correspond to the maximum range $D_{max}$ of the lidar system 100. As an example, the maximum pulse period may be expressed as $\tau_{max}=2D_{max}/c+3$. If the maximum range $D_{max}$ of the lidar system 100 is 200 m and the buffer time $\beta$ is 0 μs, then the maximum pulse period $\tau_{max}$ is approximately 1.33 μs. If the maximum range $D_{max}$ of the lidar system 100 is 200 m and the buffer time $\beta$ is 200 ns, then $T_{max}$ is approximately 1.53 μs. If the maximum range $D_{max}$ of the lidar system 100 is 150 m and the buffer time $\beta$ is 10 ns, then the maximum pulse period is approximately 1.01 μs. After a pulse is emitted, the lidar system 100 may wait for a time period of up to $\tau_{max}$ to elapse, and if no return pulse is received within that time period, then the lidar system 100 may send out the next pulse. In the example of FIG. 13, after pulse 300-U is emitted, the lidar system 100 waits for the maximum pulse period $\tau_{max}$ to elapse, and since no return pulse is detected within that time period, the lidar system 100 then emits the next pulse 300-V.

In particular embodiments, a lidar system 100 may operate in a mode that includes any suitable combination of standard-resolution pulses, high-resolution pulses, hybrid-resolution pulses, or adaptive-resolution pulses. In particular embodiments, a single scan may include any suitable combination of standard-resolution pulses, high-resolution pulses, hybrid-resolution pulses, or adaptive-resolution pulses. As an example, a single scan may include a combination of high-resolution pulses and adaptive-resolution pulses. For such a high-resolution scan using adaptive-resolution pulses, the maximum pulse period may be set to a high-resolution pulse period $\tau_2$, and if a return pulse is received prior to the high-resolution pulse period elapsing, then the lidar system may then emit the next pulse (without waiting for the full pulse period $\tau_2$ to elapse). In particular embodiments, a lidar system 100 may use two or more particular scan techniques where each scan technique includes one or more particular type of pulses. As an example, a lidar system 100 may perform a standard-resolution scan followed by a high-resolution scan using adaptive-resolution pulses. As another example, a lidar system 100 may perform a standard-resolution scan using adaptive-resolution pulses so that the standard pulse period $\tau_1$ is dynamically varied based on the time of flight of pulses. Additionally, the lidar system 100 may perform a high-resolution scan using high-resolution pulses (e.g., with a fixed high-resolution pulse period $\tau_2$) or a high-resolution scan using adaptive-resolution pulses (e.g., with a dynamically adjusted pulse period and the maximum pulse period set to a high-resolution pulse period $\tau_2$).

Figure 14:
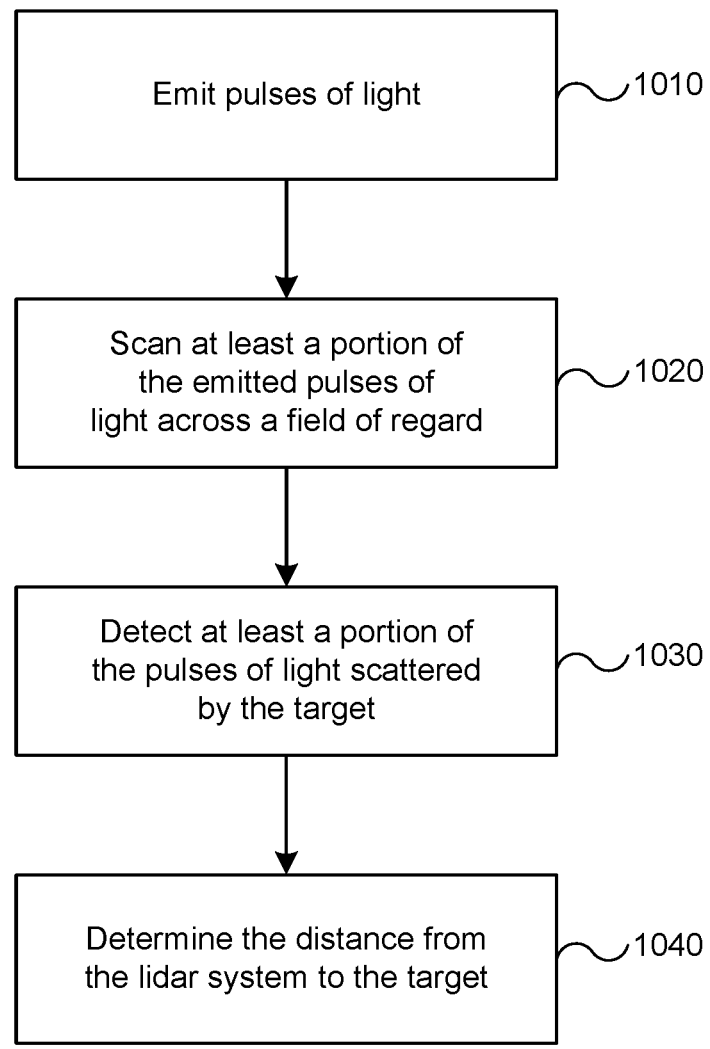
FIG. 14 illustrates an example method for determining a distance from a lidar system to a target.

FIG. 14 illustrates an example method 1000 for determining a distance from a lidar system 100 to a target 130. The method may begin at step 1010, where pulses of light may be emitted by a light source 110 of a lidar system 100. As an example, light source 110 may be a pulsed laser that emits pulses with a 0.2-2 ns duration and a wavelength of 1400-1600 nm. In particular embodiments, the pulses of light may include standard-resolution pulses, high-resolution pulses, hybrid-resolution pulses, or adaptive-resolution pulses. At step 1020, at least a portion of the emitted pulses of light may be scanned across a field of regard. The field of regard may contain all or part of a target 130 located a distance from the lidar system 100 that is less than or equal to a maximum range ($D_{max}$) of the lidar system 100, and at least a portion of the emitted pulses of light may be scattered by the target 130. At step 1030, at least a portion of the pulses of light scattered by the target 130 may be detected. As an example, pulses of light scattered by a target 130 may be detected by an APD detector that is part of a receiver 140. At step 1040, the distance from the lidar system 100 to the target 130 may be determined, at which point the method may end. The distance from the lidar system 100 to the target 130 may be determined based at least in part on a time of flight for an emitted pulse to travel from the lidar system 100 to the target 130 and back to the lidar system 100.

Figure 15:
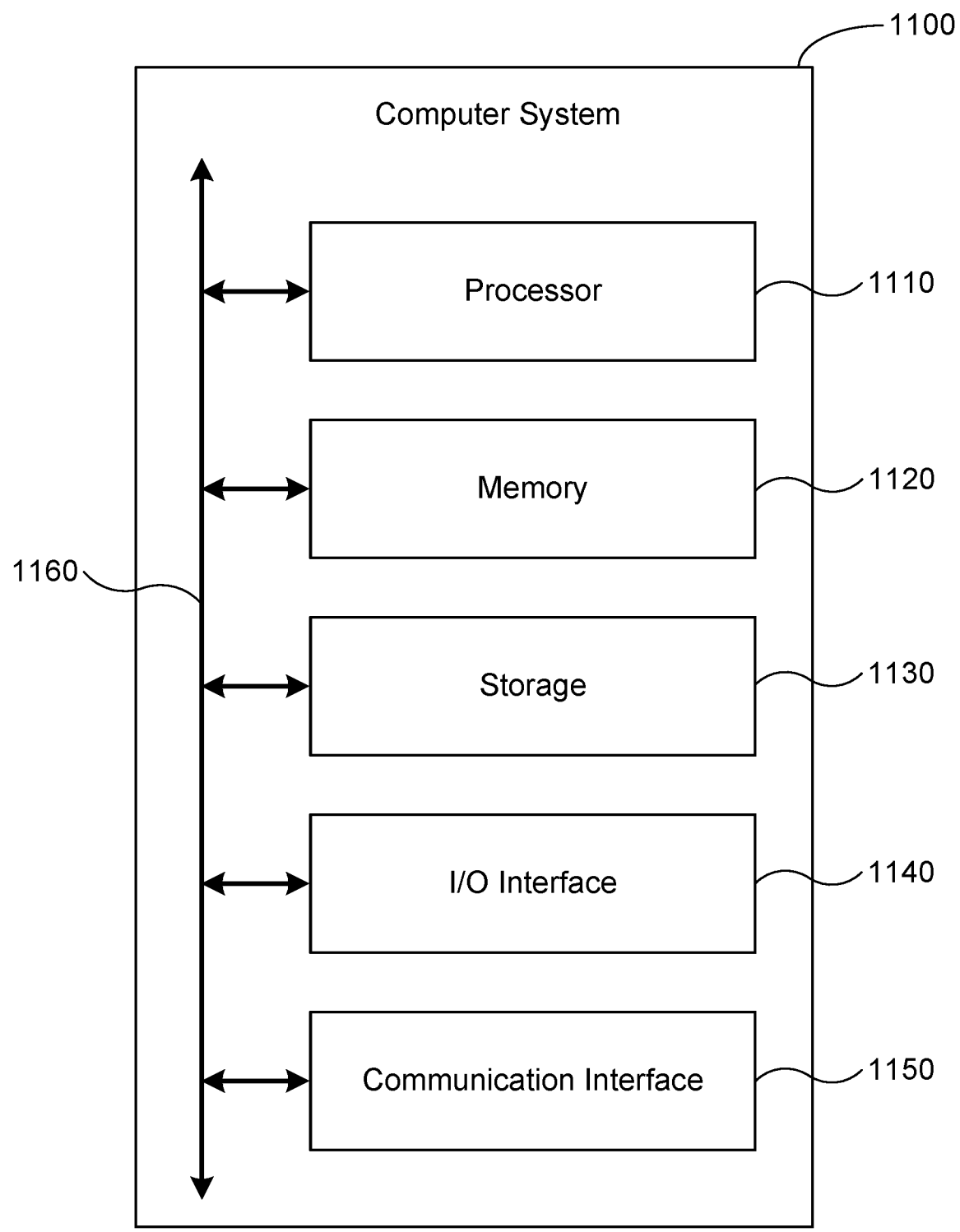
FIG. 15 illustrates an example computer system.

FIG. 15 illustrates an example computer system 1100. In particular embodiments, one or more computer systems 1100 may perform one or more steps of one or more methods described or illustrated herein. In particular embodiments, one or more computer systems 1100 may provide functionality described or illustrated herein. In particular embodiments, software running on one or more computer systems 1100 may perform one or more steps of one or more methods described or illustrated herein or may provide functionality described or illustrated herein. Particular embodiments may include one or more portions of one or more computer systems 1100. In particular embodiments, a computer system may be referred to as a computing device, a computing system, a computer, a general-purpose computer, or a data-processing apparatus. Herein, reference to a computer system may encompass one or more computer systems, where appropriate.

Computer system 1100 may take any suitable physical form. As an example, computer system 1100 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 1100 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

As illustrated in the example of FIG. 15, computer system 1100 may include a processor 1110, memory 1120, storage 1130, an input/output (I/O) interface 1140, a communication interface 1150, or a bus 1160. Computer system 1100 may include any suitable number of any suitable components in any suitable arrangement.

In particular embodiments, processor 1110 may include hardware for executing instructions, such as those making up a computer program. As an example, to execute instructions, processor 1110 may retrieve (or fetch) the instructions from an internal register, an internal cache, memory 1120, or storage 1130; decode and execute them; and then write one or more results to an internal register, an internal cache, memory 1120, or storage 1130. In particular embodiments, processor 1110 may include one or more internal caches for data, instructions, or addresses. Processor 1110 may include any suitable number of any suitable internal caches, where appropriate. As an example, processor 1110 may include one or more instruction caches, one or more data caches, or one or more translation lookaside buffers (TLBs). Instructions in the instruction caches may be copies of instructions in memory 1120 or storage 1130, and the instruction caches may speed up retrieval of those instructions by processor 1110. Data in the data caches may be copies of data in memory 1120 or storage 1130 for instructions executing at processor 1110 to operate on; the results of previous instructions executed at processor 1110 for access by subsequent instructions executing at processor 1110 or for writing to memory 1120 or storage 1130; or other suitable data. The data caches may speed up read or write operations by processor 1110. The TLBs may speed up virtual-address translation for processor 1110. In particular embodiments, processor 1110 may include one or more internal registers for data, instructions, or addresses. Processor 1110 may include any suitable number of any suitable internal registers, where appropriate. Where appropriate, processor 1110 may include one or more arithmetic logic units (ALUs); may be a multi-core processor; or may include one or more processors 1110.

In particular embodiments, memory 1120 may include main memory for storing instructions for processor 1110 to execute or data for processor 1110 to operate on. As an example, computer system 1100 may load instructions from storage 1130 or another source (such as, for example, another computer system 1100) to memory 1120. Processor 1110 may then load the instructions from memory 1120 to an internal register or internal cache. To execute the instructions, processor 1110 may retrieve the instructions from the internal register or internal cache and decode them. During or after execution of the instructions, processor 1110 may write one or more results (which may be intermediate or final results) to the internal register or internal cache. Processor 1110 may then write one or more of those results to memory 1120. One or more memory buses (which may each include an address bus and a data bus) may couple processor 1110 to memory 1120. Bus 1160 may include one or more memory buses. In particular embodiments, one or more memory management units (MMUs) may reside between processor 1110 and memory 1120 and facilitate accesses to memory 1120 requested by processor 1110. In particular embodiments, memory 1120 may include random access memory (RAM). This RAM may be volatile memory, where appropriate. Where appropriate, this RAM may be dynamic RAM (DRAM) or static RAM (SRAM). Memory 1120 may include one or more memories 1120, where appropriate.

In particular embodiments, storage 1130 may include mass storage for data or instructions. As an example, storage 1130 may include a hard disk drive (HDD), a floppy disk drive, flash memory, an optical disc, a magneto-optical disc, magnetic tape, or a Universal Serial Bus (USB) drive or a combination of two or more of these. Storage 1130 may include removable or non-removable (or fixed) media, where appropriate. Storage 1130 may be internal or external to computer system 1100, where appropriate. In particular embodiments, storage 1130 may be non-volatile, solid-state memory. In particular embodiments, storage 1130 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 1130 may include one or more storage control units facilitating communication between processor 1110 and storage 1130, where appropriate. Where appropriate, storage 1130 may include one or more storages 1130.

In particular embodiments, I/O interface 1140 may include hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 1140 may include one or more device or software drivers enabling processor 1110 to drive one or more of these I/O devices. I/O interface 1140 may include one or more I/O interfaces 1140, where appropriate.

In particular embodiments, communication interface 1150 may include hardware, software, or both providing one or more interfaces for communication (such as, for example, packet-based communication) between computer system 1100 and one or more other computer systems 1100 or one or more networks. As an example, communication interface 1150 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 1100 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a Worldwide Interoperability for Microwave Access (WiMAX) network, a cellular telephone network (such as, for example e, a Global System for Mobile Communications (GSM) network), or other suitable wireless network or a combination of two or more of these. As another example, computer system 1100 may communicate using fiber-optic communication based on 100 Gigabit Ethernet (100 GbE), 10 Gigabit Ethernet (10 GbE), or Synchronous Optical Networking (SONET). Computer system 1100 may include any suitable communication interface 1150 for any of these networks, where appropriate. Communication interface 1150 may include one or more communication interfaces 1150, where appropriate.

In particular embodiments, bus 1160 may include hardware, software, or both coupling components of computer system 1100 to each other. As an example, bus 1160 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 1160 may include one or more buses 1160, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 1100. As an example, computer software may include instructions configured to be executed by processor 1110. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
a light source configured to emit pulses of light, wherein the emitted pulses of light comprise one or more series of standard-resolution pulses alternating with one or more series of high-resolution pulses, wherein each series of the standard-resolution pulses comprises a plurality of pulses having a standard pulse period, and each series of the high-resolution pulses comprises a plurality of pulses having a high-resolution pulse period, wherein:
the standard pulse period is greater than or equal to a round-trip time associated with a maximum range of the lidar system; and
the high-resolution pulse period is less than the standard pulse period;
a scanner configured to scan at least a portion of the emitted pulses of light across a field of regard, wherein:
the field of regard contains all or part of a target located a distance from the lidar system that is less than or equal to the maximum range of the lidar system; and
one or more of the emitted pulses of light are scattered by the target;
a receiver configured to detect at least a portion of the pulses of light scattered by the target; and
a processor configured to:
determine a standard-resolution point cloud from one or more series of the standard-resolution pulses, wherein each standard-resolution pixel in the standard-resolution point cloud is associated with a standard-resolution distance value;
determine a high-resolution point cloud from one or more series of the high-resolution pulses and the standard-resolution point cloud, wherein an ambiguity in a distance value of the high-resolution point cloud is resolved based at least in part on one or more standard-resolution distance values; and
determine the distance from the lidar system to the target based at least in part on a round-trip time of flight for an emitted pulse of light to travel from the lidar system to the target and back to the lidar system.

2. The lidar system of claim 1, wherein:
each emitted high-resolution pulse is associated with a respective window of time, each window of time comprising a center time and a width; and
the width of a particular window associated with a particular emitted high-resolution pulse represents a time interval within which a return pulse associated with the particular emitted high-resolution pulse is expected to be received by the lidar system.

3. The lidar system of claim 2, wherein the processor is further configured to identify a pulse received within the width of the particular window as a valid return pulse that is associated with the particular emitted high-resolution pulse.

4. The lidar system of claim 3, wherein the processor is further configured to ignore another pulse received outside the width of the particular window.

5. The lidar system of claim 2, wherein the processor is further configured to ignore a pulse received outside of one or more windows associated with one or more respective emitted high-resolution pulses.

6. The lidar system of claim 2, wherein the center time of the particular window is based at least in part on distance or time information determined from one or more standard-resolution pulses emitted prior to the particular emitted high-resolution pulse.

7. The lidar system of claim 6, wherein the center time of the particular window is approximately equal to a time of flight for the one or more standard-resolution pulses emitted prior to the particular emitted high-resolution pulse, wherein the time of flight represents a round-trip time for at least one of the one or more standard-resolution pulses to travel to the target and back to the lidar system.

8. The lidar system of claim 2, wherein the width of the particular window is less than or equal to 20% of the center time of the particular window.

9. The lidar system of claim 1, wherein the round-trip time associated with the maximum range is approximately $2D_{max}/c$, wherein $D_{max}$ is the maximum range and c is a speed of light.

10. The lidar system of claim 1, wherein the high-resolution pulse period is less than or equal to one half of the standard pulse period.

11. The lidar system of claim 1, wherein the light source comprises a laser diode followed by a semiconductor optical amplifier (SOA), wherein the SOA is configured to receive light from the laser diode and amplify the light as it propagates through a waveguide of the SOA.

12. The lidar system of claim 1, wherein the light source comprises a direct-emitter laser diode configured to produce the emitted pulses of light.

13. The lidar system of claim 1, wherein the scanner comprises one or more scanning mirrors, wherein each scanning mirror is mechanically driven by a galvanometer scanner, a resonant scanner, a microelectromechanical systems (MEMS) device, a voice coil motor, or a synchronous electric motor.

14. The lidar system of claim 1, wherein the scanner comprises:
a scanning mirror configured to scan the emitted pulses of light along a first direction; and
a polygon mirror configured to scan the emitted pulses of light along a second direction substantially orthogonal to the first direction.

15. The lidar system of claim 1, wherein scanning the emitted pulses of light across the field of regard comprises:
performing a first scan of the field of regard with a series of the standard-resolution pulses; and performing, after the first scan, a second scan of all or a portion of the field of regard with a series of the high-resolution pulses.

16. The lidar system of claim 1, wherein:
scanning the emitted pulses of light across the field of regard comprises scanning a field of view of the light source across the field of regard; and
the scanner is further configured to scan a field of view of the receiver across the field of regard, wherein the light-source field of view and the receiver field of view are scanned synchronously with respect to one another, wherein:
  a scanning speed of the light-source field of view and a scanning speed of the receiver field of view are equal; and
  the light-source field of view and the receiver field of view maintain a same relative position to one another as they are scanned across the field of regard.

17. The lidar system of claim 1, wherein the lidar system is part of a vehicle comprising an advanced driver assistance system (ADAS) configured to assist a driver of the vehicle in operating the vehicle.

18. The lidar system of claim 1, wherein the lidar system is part of an autonomous vehicle comprising an autonomous-vehicle driving system, wherein the lidar system is configured to provide information about a surrounding environment to the autonomous-vehicle driving system.

19. The lidar system of claim 15, wherein the second scan comprises a high-resolution scan region that includes the target, wherein a size or a location of the high-resolution scan region is determined based at least in part on a relative motion of the target with respect to the lidar system.

* * * * *